US011519306B2

(12) United States Patent
Hamada et al.

(10) Patent No.: US 11,519,306 B2
(45) Date of Patent: Dec. 6, 2022

(54) FLUID CONTROL VALVE, AND VALVE TIMING ADJUSTING DEVICE EMPLOYING SAME

(71) Applicant: DENSO CORPORATION, Kariya (JP)

(72) Inventors: Takuya Hamada, Nisshin (JP); Makoto Otsubo, Nisshin (JP); Tetsuro Mitsutani, Kariya (JP); Kinya Takahashi, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 17/167,323

(22) Filed: Feb. 4, 2021

(65) Prior Publication Data

US 2021/0180476 A1 Jun. 17, 2021

Related U.S. Application Data

(63) Continuation of application No. PCT/JP2019/030883, filed on Aug. 6, 2019.

(30) Foreign Application Priority Data

Aug. 8, 2018 (JP) ............................ JP2018-149379

(51) Int. Cl.
*F01L 1/344* (2006.01)
*F16K 3/28* (2006.01)

(52) U.S. Cl.
CPC .............. *F01L 1/3442* (2013.01); *F16K 3/28* (2013.01); *F01L 2001/3443* (2013.01); *F01L 2001/34426* (2013.01); *F01L 2001/34433* (2013.01)

(58) Field of Classification Search
CPC ........... F01L 1/3442; F01L 2001/34426; F01L 2001/3443; F01L 2001/34433; F01L 2301/00; F16K 3/28; F16K 15/08; F16K 15/145; Y10T 137/7896
See application file for complete search history.

(56) References Cited

U.S. PATENT DOCUMENTS

2014/0116365 A1* 5/2014 Scheidig ................ F01L 1/344 123/90.17
2015/0218977 A1* 8/2015 Hofmann ............. F01L 1/3442 123/90.17
2019/0323388 A1 10/2019 Mitsutani
2019/0323392 A1 10/2019 Mitsutani
2019/0368387 A1 12/2019 Mitsutani

FOREIGN PATENT DOCUMENTS

DE 200760 8/1907
DE 10 2010 011 835 9/2011
DE 102017118666 A1 * 2/2019 ............. F16K 15/04
WO WO-2015037351 A1 * 3/2015 ................ F01L 1/34

* cited by examiner

*Primary Examiner* — Devon C Kramer
*Assistant Examiner* — Wesley G Harris
(74) *Attorney, Agent, or Firm* — Nixon & Vanderhye P.C.

(57) ABSTRACT

A check valve is made of a resilient body wound in a ring form and is located in an annular flow passage. A displacement limiter includes: a limiter main body that is located on an outer side of the check valve and is configured to limit displacement of the check valve in a diameter increasing direction of the check valve; and a limiter flow passage that communicates between one side and the other side of the limiter main body in an axial direction to enable hydraulic oil to flow between the one side and the other side of the limiter main body through the limiter flow passage.

14 Claims, 15 Drawing Sheets

10
PC
20
21
II
22
321
200
221
33
30
32
34
25
223
222
400
40
50
41
110
100
49
24
59
3
9
11, OC
60
72
31
71
63
Sv
101
12
RRs, RAs
23
81
90
RRd, RAd
6
1
4
5
8, OS
2
7, OD

FLUID CONTROL VALVE, AND VALVE TIMING ADJUSTING DEVICE EMPLOYING SAME

CROSS REFERENCE TO RELATED APPLICATIONS

This application is a continuation application of International Patent Application No. PCT/JP2019/030883 filed on Aug. 6, 2019, which designated the U.S. and claims the benefit of priority from Japanese Patent Application No. 2018-149379 filed on Aug. 8, 2018. The entire disclosures of all of the above applications are incorporated herein by reference.

TECHNICAL FIELD

The present disclosure relates to a fluid control valve and a valve timing adjusting device employing the same.

BACKGROUND

Previously, there is known a fluid control valve that includes a check valve made of a resilient body shaped in a ring form. In one previously proposed fluid control valve, the check valve is installed in an annular flow passage which is located on an outer side of a tubular valve piston and is shaped in an annular form. When a diameter of the check valve is increased to place the check valve in a valve opening state, the check valve enables flow of fluid from an inside of the valve piston to the annular flow passage. In contrast, when the diameter of the check valve is decreased to place the check valve in a valve closing state, the check valve limits flow of the fluid from the annular flow passage to the inside of the valve piston.

SUMMARY

This section provides a general summary of the disclosure, and is not a comprehensive disclosure of its full scope or all of its features.

According to the present disclosure, there is provided a fluid control valve configured to control flow of fluid. The fluid control valve includes a check valve and a displacement limiter. The check valve is made of a resilient body wound in a ring form. The displacement limiter includes: a limiter main body that is located on an outer side of the check valve and is configured to limit displacement of the check valve in a diameter increasing direction of the check valve; and a limiter flow passage that communicates between one side and another side of the limiter main body in an axial direction to enable the fluid to flow between the one side and the another side of the limiter main body through the limiter flow passage.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
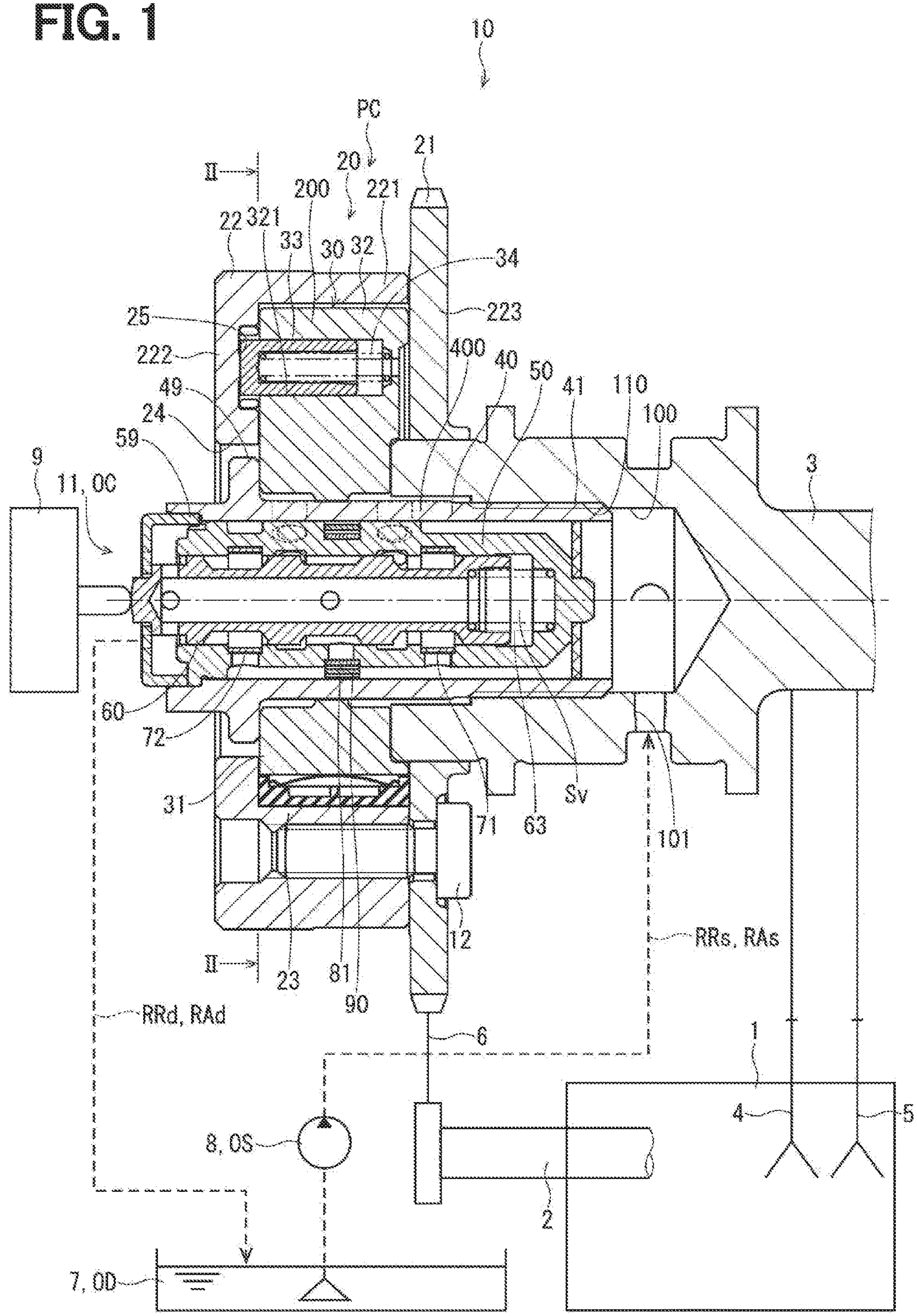
FIG. 1 is a cross-sectional view of a valve timing adjusting device according to a first embodiment.

Previously, there is known a fluid control valve that includes a check valve made of a resilient body shaped in a ring form. In one previously proposed fluid control valve, the check valve is installed in an annular flow passage which is located on an outer side of a tubular valve piston and is shaped in an annular form. When a diameter of the check valve is increased to place the check valve in a valve opening state, the check valve enables flow of fluid from an inside of the valve piston to the annular flow passage. In contrast, when the diameter of the check valve is decreased to place the check valve in a valve closing state, the check valve limits flow of the fluid from the annular flow passage to the inside of the valve piston.

In the previously proposed fluid control valve, a limiter element, which is shaped in a tubular form, is placed on a radially outer side of the check valve to limit displacement of the check valve in a diameter increasing direction that is defined as a direction for increasing a diameter of the check valve. Therefore, it is possible to limit occurrence of a damage caused by excessive deformation of the check valve. In the previously proposed fluid control valve, in a case where a flow passage, which is connected to the annular flow passage and extends in the axial direction of the valve piston, is formed, the flow of the fluid in this flow passage may possibly be obstructed by the limiter element. Therefore, a flow rate of the fluid in this flow passage may possibly be decreased.

According to the present disclosure, there is provided a fluid control valve configured to control flow of fluid supplied from a fluid supply source to a fluid supply destination and includes: an outer tubular portion; an inner tubular portion; an axial flow passage; an annular flow passage; a valve seat surface; a valve seat flow passage; a check valve; and a displacement limiter.

The inner tubular portion is located at an inside of the outer tubular portion. The axial flow passage is located between the outer tubular portion and the inner tubular portion and extends in an axial direction of the outer tubular portion and the inner tubular portion such that the axial flow passage conducts the fluid that flows from the fluid supply source to the fluid supply destination. The annular flow passage is located between the outer tubular portion and the inner tubular portion and is shaped in an annular form to extend in a circumferential direction of the outer tubular portion and the inner tubular portion while the annular flow passage is connected to the axial flow passage. The valve seat surface is shaped in a cylindrical form and is formed at the inner tubular portion in the annular flow passage. The valve seat flow passage communicates between the valve seat surface and an inside of the inner tubular portion.

The check valve is made of a resilient body wound in a ring form and is located in the annular flow passage. The check valve is placed in a valve opening state to enable flow of the fluid from the valve seat flow passage to the annular flow passage when a diameter of the check valve is increased in a diameter increasing direction to lift the check valve away from the valve seat surface, and the check valve is placed in a valve closing state to limit flow of the fluid from the annular flow passage to the valve seat flow passage when the diameter of the check valve is decreased to seat the check valve against the valve seat surface. The displacement limiter includes: a limiter main body that is located on an outer side of the check valve in the annular flow passage and is configured to limit displacement of the check valve in the diameter increasing direction of the check valve; and a limiter flow passage that communicates between one side and another side of the limiter main body in the axial direction of the outer tubular portion and the inner tubular portion to enable the fluid to flow between the one side and the another side of the limiter main body through the limiter flow passage.

In the present disclosure, the displacement of the check valve in the diameter increasing direction can be limited by the limiter main body of the displacement limiter. Therefore, it is possible to limit occurrence of the damage caused by the excessive deformation of the check valve. Furthermore, the displacement limiter includes the limiter flow passage that communicates between the one side and the another side of the limiter main body in the axial direction of the outer tubular portion and the inner tubular portion to enable the fluid to flow between the one side and the another side of the limiter main body through the limiter flow passage. Thus, the fluid, which flows in the axial flow passage, can flow along the limiter flow passage, and thereby the interference of the flow of the fluid by the displacement limiter placed in the annular flow passage is limited. Therefore, it is possible to limit a decrease in a flow rate of the fluid supplied to the fluid supply destination.

Hereinafter, a fluid control valve and a valve timing adjusting device of a plurality of embodiments of the present disclosure will be described with reference to the drawings. Components, which are substantially the same in the plurality of embodiments, are denoted by the same reference signs and will not be described redundantly. Moreover, the components, which are substantially the same in the plurality of embodiments, exert the same or similar effects.

First Embodiment

Figure 2:
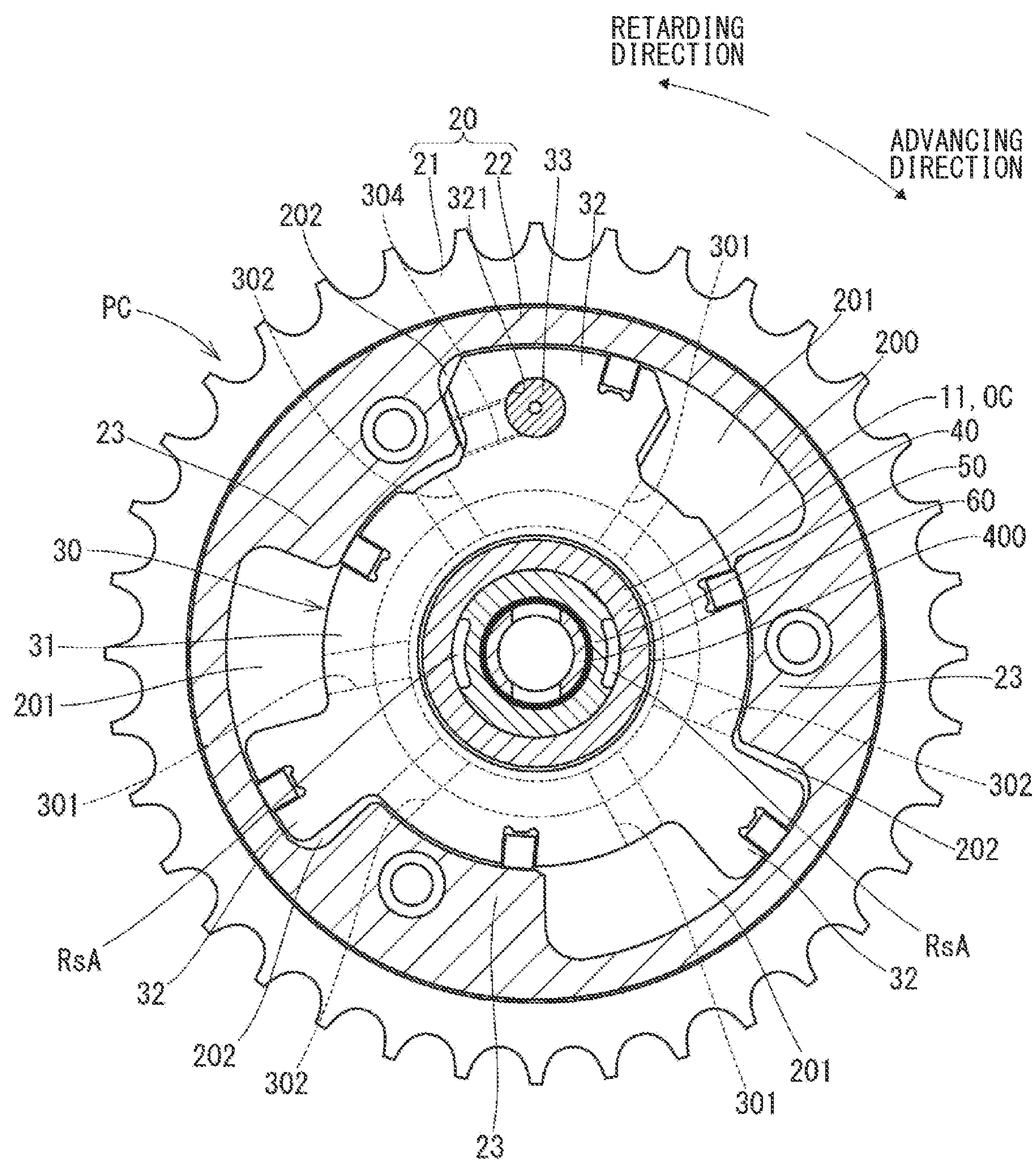
FIG. 2 is a cross-sectional view taken along line II-II in FIG. 1.

FIGS. 1 and 2 show a fluid control valve and a valve timing adjusting device having the same according to a first embodiment. The valve timing adjusting device 10 changes a rotational phase of a camshaft 3 relative to a crankshaft 2 of an engine 1 (serving as an internal combustion engine), so that the valve timing adjusting device 10 adjusts a valve timing of intake valves 4 among the intake valves 4 and exhaust valves 5 driven to open and close by the camshaft 3. The valve timing adjusting device 10 is installed in a drive force transmission path that extends from the crankshaft 2 to the camshaft 3. The crankshaft 2 serves as a drive shaft. The camshaft 3 serves as a driven shaft. The intake valves 4 and the exhaust valves 5 serve as valves.

The structure of the valve timing adjusting device 10 will be described with reference to FIGS. 1 and 2. The valve timing adjusting device 10 includes a phase converter PC, a hydraulic oil supply source (serving as a fluid supply source) OS, a hydraulic oil controller OC, an oil discharge portion OD, a retard supply oil passage RRs, an advance oil supply passage RAs, a retard drain oil passage RRd and an advance drain oil passage RAd (the retard drain oil passage RRd and the advance drain oil passage RAd serving as drain oil passages).

The phase converter PC includes a housing 20 and a vane rotor 30. The housing 20 has a gear portion 21 and a case 22. The case 22 has a tubular portion 221 and plate portions 222, 223. The tubular portion 221 is shaped in a tubular form. The plate portion 222 is integrally formed with the tubular portion 221 in one-piece such that the plate portion 222 closes one end of the tubular portion 221. The plate portion 223 is formed to close the other end of the tubular portion 221. In this way, a space 200 is formed at an inside of the housing 20. The plate portion 223 is fixed to the tubular portion 221 by bolts 12. The gear portion 21 is formed at an outer periphery of the plate portion 223.

The plate portion 223 is fitted to an end part of the camshaft 3. The camshaft 3 rotatably supports the housing 20. A chain 6 is wound around the gear portion 21 and the crankshaft 2. The gear portion 21 is rotated synchronously with the crankshaft 2. The case 22 forms a plurality of partition wall portions 23 that inwardly project from the tubular portion 221 in the radial direction. An opening 24 is formed at a center of the plate portion 222 of the case 22 such that the opening 24 opens to the space, which is located at the outside of the case 22. The opening 24 is located on an opposite side of the vane rotor 30, which is opposite to the camshaft 3.

The vane rotor 30 has a boss 31 and a plurality of vanes 32. The boss 31 is shaped in a tubular form and is fixed to the end portion of the camshaft 3. Each of the vanes 32 outwardly projects from the boss 31 in the radial direction and is placed between corresponding adjacent two of the partition wall portions 23. The space 200, which is formed at the inside of the housing 20, is divided into retard chambers 201 and advance chambers 202 by the vanes 32. That is, the housing 20 forms the retard chambers 201 and the advance chambers 202 between the housing 20 and the vane rotor 30. Each retard chamber 201 is positioned on one circumferential side of the corresponding vane 32. Each advance chamber 202 is positioned on the other circumferential side of the corresponding vane 32. The vane rotor 30 rotates relative to the housing 20 in a retarding direction or an advancing direction according to an oil pressure of the hydraulic oil (serve as the fluid) supplied to the respective retard chambers 201 and an oil pressure of the hydraulic oil (serve as the fluid) supplied to the respective advance chambers 202. Here, the retard chambers 201 and the advance chambers 202 correspond to hydraulic chambers (respectively serving as a fluid supply destination).

In the present embodiment, the hydraulic oil control valve (serving as a fluid control valve) 11 corresponds to the hydraulic oil controller OC. The hydraulic oil control valve 11 includes a sleeve 400, a spool 60, a recycle oil passage Rre, a retard supply check valve 71, an advance supply check valve 72, a recycle check valve (serving as a check valve) 81 and a displacement limiter 90.

In the present embodiment, the hydraulic oil control valve 11 is placed at the center part of the housing 20 and the vane rotor 30, i.e., the phase converter PC (see FIGS. 1 and 2). The hydraulic oil control valve 11 is placed such that at least a portion of the hydraulic oil control valve 11 is placed at the inside of the housing 20. The hydraulic oil control valve 11 is placed along a rotational axis of the phase converter PC.

Figure 3:
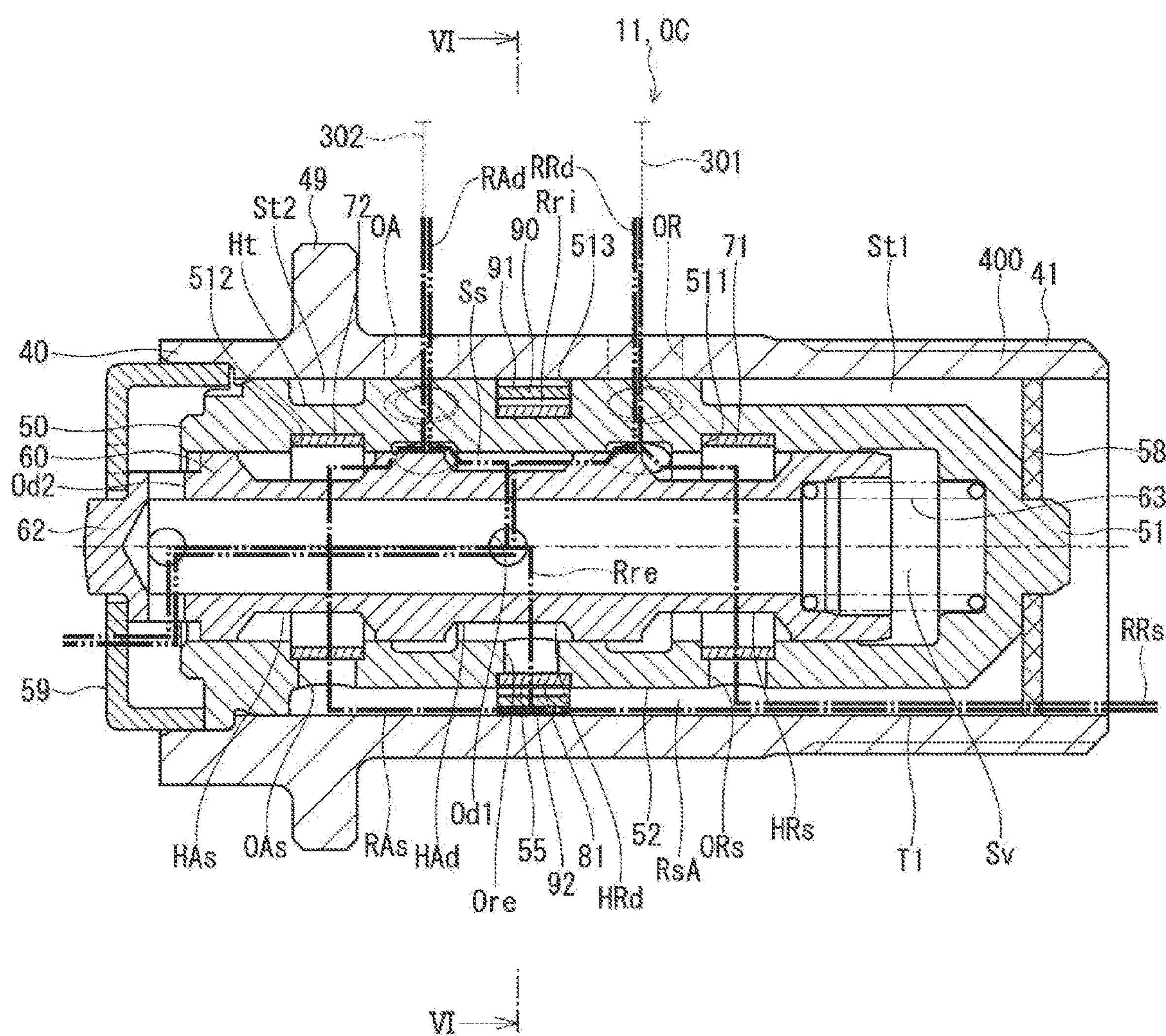
FIG. 3 is a cross-sectional view of a fluid control valve of the valve timing adjusting device according to the first embodiment.

The sleeve 400 includes an outer sleeve (serving as an outer tubular portion) 40 and an inner sleeve (serving as an inner tubular portion) 50. The outer sleeve 40 is shaped substantially in a cylindrical tubular form and is made of a material, which includes, for example, iron and has relatively high hardness. An inner peripheral wall of the outer sleeve 40 is shaped substantially in a cylindrical form. As illustrated in FIG. 3, a threaded portion 41 is formed at an outer peripheral wall of one end portion of the outer sleeve 40. A retaining portion 49 is formed at the other end portion of the outer sleeve 40 such that the retaining portion 49 is shaped in a ring form and outwardly extends from an outer peripheral wall of the other end portion of the outer sleeve 40 in the radial direction.

A shaft hole 100 and a supply hole 101 are formed at an end portion of the camshaft 3 located on the side where the valve timing adjusting device 10 is placed. The shaft hole 100 is formed to extend in an axial direction of the camshaft 3 from a center part of an end surface of the camshaft 3, which is located on the side where valve timing adjusting device 10 is placed. The supply hole 101 is formed such that the supply hole 101 inwardly extend from an outer wall of the camshaft 3 in the radial direction and is communicated with the shaft hole 100 (see FIG. 1).

A shaft-side threaded portion 110 is formed at an inner wall of the shaft hole 100 of the camshaft 3 to threadably engage with the threaded portion 41 of the outer sleeve 40. The outer sleeve 40 passes through the inside of the boss 31 of the vane rotor 30 and is fixed to the camshaft 3 such that the threaded portion 41 of the outer sleeve 40 is engaged with the shaft-side threaded portion 110 of the camshaft 3. At this time, the retaining portion 49 retains an end surface of the boss 31 of the vane rotor 30, which is opposite to the camshaft 3. In this way, the vane rotor 30 is fixed to the camshaft 3 such that the vane rotor 30 is held between the camshaft 3 and the retaining portion 49. The outer sleeve 40 is thus installed to the center part of the vane rotor 30. In the present embodiment, the hydraulic oil supply source OS is an oil pump 8.

The oil discharge portion OD is an oil pan 7. The oil pump 8 is connected to the supply hole 101. The oil pump 8 suctions the hydraulic oil stored in the oil pan 7 and supplies the suctioned hydraulic oil to the supply hole 101. As a result, the hydraulic oil flows into the shaft hole 100.

The inner sleeve 50 is shaped substantially in a cylindrical tubular form and is made of a material, which includes, for example, aluminum and has relatively low hardness. Specifically, the inner sleeve 50 is made of the material that has the hardness lower than that of the outer sleeve 40. An inner peripheral wall and an outer peripheral wall of the inner sleeve 50 are respectively shaped substantially in a cylindrical form. The inner sleeve 50 is subjected to surface hardening using anodized aluminum or the like, so that a surface layer of the inner sleeve 50 has hardness that is higher than hardness of a base material of the inner sleeve 50.

As illustrated in FIG. 3, the inner sleeve 50 is placed at the inside of the outer sleeve 40 such that an outer peripheral wall of the inner sleeve 50 is fitted to an inner peripheral wall of the outer sleeve 40. The inner sleeve 50 is immovable relative to the outer sleeve 40. A sleeve sealing portion 51 is formed at one end of the inner sleeve 50. The sleeve sealing portion 51 closes the one end of the inner sleeve 50.

The spool 60 is shaped substantially in a cylindrical tubular form and is made of, for example, metal. The spool 60 is placed in an inside of the inner sleeve 50 such that an outer peripheral wall of the spool 60 is slidable along the inner peripheral wall of the inner sleeve 50 to enable reciprocation of the spool 60 in the axial direction. Specifically, the spool 60 is placed at the inside of the inner sleeve 50 such that the spool 60 is movable in the axial direction relative to the inner sleeve 50. A spool sealing portion 62 is formed at one end of the spool 60. The spool sealing portion 62 closes the one end of the spool 60.

A variable volume space Sv is formed between the sleeve sealing portion 51 and the other end of the spool 60 at the inside of the inner sleeve 50. A volume of the variable volume space Sv changes when the spool 60 is moved in the axial direction relative to the inner sleeve 50. Specifically, the sleeve sealing portion 51 forms the variable volume space Sv, the volume of which changes, between the sleeve sealing portion 51 and the spool 60.

A spring 63 is installed in the variable volume space Sv. The spring 63 is a so-called coil spring. One end of the spring 63 contacts the sleeve sealing portion 51, and other end of the spring 63 contacts the other end of the spool 60. The spring 63 urges the spool 60 in a direction away from the sleeve sealing portion 51.

A retaining portion 59 is placed on the radially inner side of the other end part of the outer sleeve 40. The retaining portion 59 is shaped in a bottomed tubular form. An outer peripheral wall of the retaining portion 59 is fitted to the inner peripheral wall of the outer sleeve 40. A hole is formed at a center of a bottom of the retaining portion 59, and the spool sealing portion 62 is installed in an inside of this hole.

The bottom of the retaining portion 59 is configured to retain the one end of the spool 60. The retaining portion 59 can limit movement of the spool 60 toward a side that is opposite to the sleeve sealing portion 51. In this way, removal of the spool 60 from the inside of the inner sleeve 50 is limited.

The spool 60 is movable in the axial direction from a position, at which the spool 60 contacts the retaining portion

59, to a position, at which the spool 60 contacts the sleeve sealing portion 51. Specifically, a movable range of the spool 60 relative to the sleeve 400 extends from the position, at which the spool 60 contacts the retaining portion 59 (see FIG. 3), to the position, at which the spool 60 contacts the sleeve sealing portion 51. Hereinafter, this movable range of the spool 60 will be referred to as a stroke range.

As illustrated in FIG. 3, the end part of the inner sleeve 50, which is located on the sleeve sealing portion 51 side, has an outer diameter that is smaller than an inner diameter of the outer sleeve 40. Thus, a cylindrical space St1, which is shaped substantially in a cylindrical form, is formed between an outer peripheral wall of the end part of the inner sleeve 50, which is located on the sleeve sealing portion 51 side, and the inner peripheral wall of the outer sleeve 40.

Moreover, an annular recess Ht is formed at the inner sleeve 50. The annular recess Ht, which is shaped in an annular form, is radially inwardly recessed at a portion of the outer peripheral wall of the inner sleeve 50, which corresponds to the retaining portion 49. In this way, an annular space St2, which is shaped in an annular form, is formed between the annular recess Ht and the inner peripheral wall of the outer sleeve 40.

Figure 4:
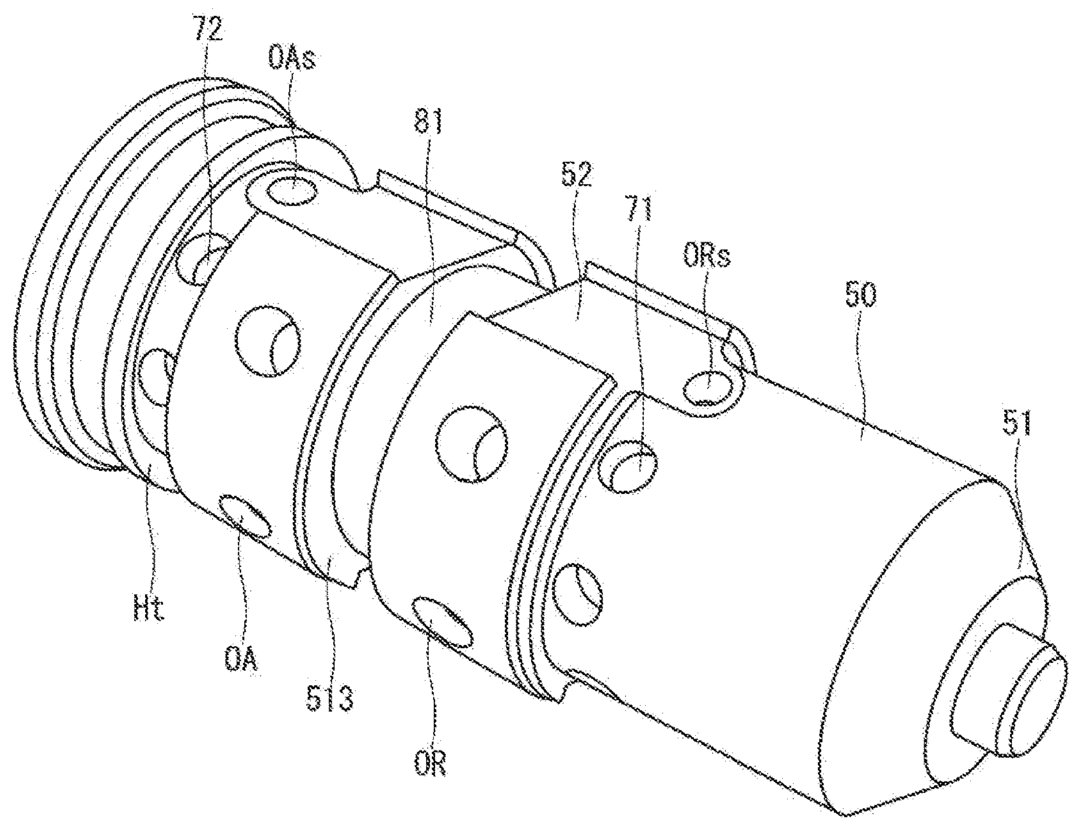
FIG. 4 is a perspective view of an inner sleeve of the fluid control valve according to the first embodiment.

Passage grooves 52 are formed at the inner sleeve 50. Each of the passage grooves 52 is radially inwardly recessed at the outer peripheral wall of the inner sleeve 50 and extends in the axial direction of the inner sleeve 50 (see FIGS. 3, 4 and 6). The number of the passage grooves 52 is two, and these passage grooves 52 are arranged one after another at equal intervals in the circumferential direction of the inner sleeve 50 (see FIG. 6). Each of the passage grooves 52 forms an axial supply oil passage (serving as an axial flow passage) RsA. Specifically, each axial supply oil passage RsA is formed to extend in the axial direction of the sleeve 400 at an interface T1 between the outer sleeve 40 and the inner sleeve 50. One end of each axial supply oil passage RsA is connected to the cylindrical space St1, and the other end of the axial supply oil passage RsA is connected to the annular space St2.

Limiting grooves 511, 512 are formed at the inner sleeve 50. The limiting groove 511, which is shaped in an annular form, is radially outwardly recessed at a portion of the inner peripheral wall of the inner sleeve 50, which corresponds to an end portion of the cylindrical space St1. The limiting groove 512, which is shaped in an annular form, is radially outwardly recessed at a portion of the inner peripheral wall of the inner sleeve 50, which corresponds to the annular recess Ht.

Furthermore, a movement limiting portion 513 is formed at the inner sleeve 50. The movement limiting portion 513 is an annular recess that is radially inwardly recessed at a portion of the outer peripheral wall of the inner sleeve 50, which is located between the limiting groove 511 and the limiting groove 512. As a result, a circumferential part of the movement limiting portion 513 is connected to the passage grooves 52.

The movement limiting portion 513 forms an annular flow passage Rri. Specifically, the annular flow passage Rri is formed in an annular form such that the annular flow passage Rri extends in the circumferential direction of the sleeve 400 while the annular flow passage Rri is connected to each of the axial supply passages RsA at a location between the outer sleeve 40 and the inner sleeve 50.

The sleeve 400 has a plurality of retard supply openings ORs, a plurality of advance supply openings OAs, a plurality of retard openings OR, a plurality of advance openings OA, and a plurality of recycle openings Ore. Each of the retard supply openings ORs extends in the radial direction of the sleeve 400 and connects the limiting groove 511 of the inner sleeve 50 to the annular space St1 and the corresponding axial supply passage RsA. The retard supply openings ORs are arranged one after another in the circumferential direction at the inner sleeve 50.

Each of the advance supply openings OAs extends in the radial direction of the sleeve 400 and connects the limiting groove 512 of the inner sleeve 50 to the annular space St2 and the corresponding axial supply passage RsA. The advance supply openings OAs are arranged one after another in the circumferential direction at the inner sleeve 50.

Each of the retard openings OR extends in the radial direction of the sleeve 400 and connects the space, which is located at the inside of the inner sleeve 50, to the space, which is located at the outside of the outer sleeve 40. The retard openings OR are arranged one after another in the circumferential direction of the sleeve 400. Each of the retard openings OR is communicated with the corresponding retard chamber 201 through a corresponding retard oil passage 301.

Each of the advance openings OA extends in the radial direction of the sleeve 400 and connects the space, which is located at the inside of the inner sleeve 50, to the space, which is located at the outside of the outer sleeve 40. The advance openings OA are formed on the retaining portion 49 side of the retard openings OR. The advance openings OA are arranged one after another in the circumferential direction of the sleeve 400. Each of the advance openings OA is communicated with the corresponding advance chamber 202 through a corresponding advance oil passage 302.

Figure 6:
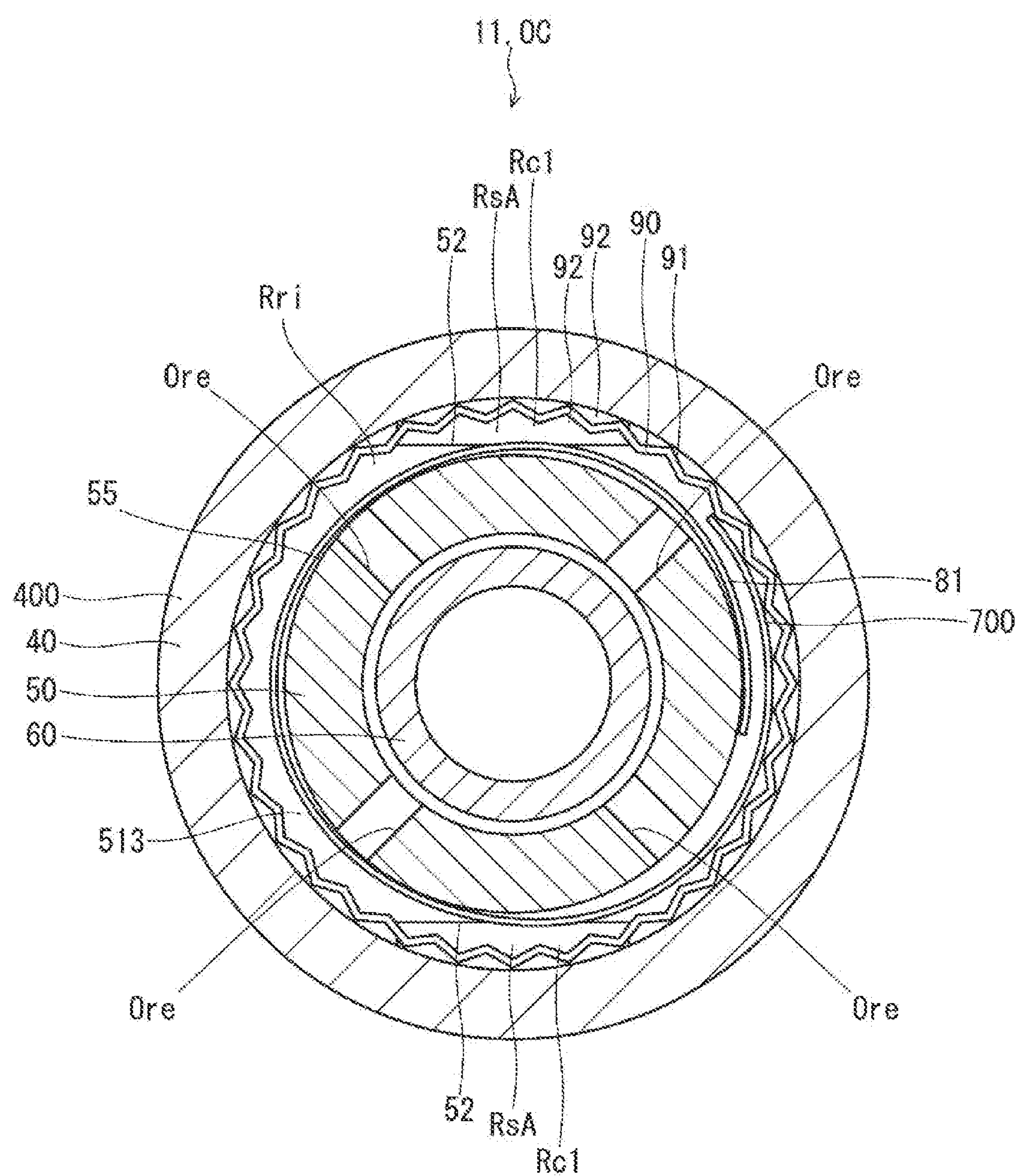
FIG. 6 is a cross-sectional view taken along line VI-VI in FIG. 3.

A valve seat surface 55, which is shaped generally in a cylindrical form, is formed at the movement limiting portion 513 of the inner sleeve 50 (see FIGS. 3 and 6). Specifically, the valve seat surface 55 is formed in the cylindrical form on the side of the annular flow passage Rri where the inner sleeve 50 is placed. Each of the recycle openings Ore extends in the radial direction of the sleeve 400 and communicates between the valve seat surface 55 and the inside of the inner sleeve 50. Specifically, each of the recycle openings Ore connects between the annular flow passage Rri and the inside space of the inner sleeve 50. The number of the recycle openings Ore is four, and these recycle openings Ore are arranged one after another at equal intervals in the circumferential direction at the inner sleeve 50 (see FIG. 6). Here, each recycle opening Ore corresponds to a valve seat flow passage. Each passage groove 52 and its associated axial supply oil passage RsA are arranged between corresponding adjacent two of the recycle openings Ore in the circumferential direction of the sleeve 400 (see FIG. 6).

The spool 60 has a retard supply recess HRs, a retard drain recess HRd, an advance drain recess HAd, an advance supply recess HAs, and a plurality of drain openings Od1, Od2. The retard supply recess HRs, the retard drain recess HRd, the advance drain recess HAd and the advance supply recess HAs are respectively shaped in an annular form and radially inwardly recessed from the outer peripheral wall of the spool 60. The retard supply recess HRs, the retard drain recess HRd, the advance drain recess HAd and the advance supply recess HAs are arranged one after another in this order in the axial direction of the spool 60. The retard drain recess HRd and the advance drain recess HAd are formed integrally. The retard drain recess HRd and the advance drain recess HAd form a specific space Ss relative to the inner peripheral wall of the inner sleeve 50. Specifically, the spool 60 forms the specific space Ss between the spool 60 and the sleeve 400.

Each drain opening Od1 communicates the inside space of the spool 60 to the retard drain recess HRd and the advance drain recess HAd, i.e., the specific space Ss. At the end part of the spool 60, which is located on the side where the spool sealing portion 62 is placed, each drain opening Od2 communicates the inside space of the spool 60 to the space located at the outside of the spool 60. The number of the drain openings Od1 is for example, two, and these drain openings Od1 are arranged one after another at equal intervals in the circumferential direction of the spool 60. The number of the drain openings Od2 is, for example, four, and these drain openings Od2 are arranged one after another at equal intervals in the circumferential direction of the spool 60.

The retard supply oil passage RRs connects the oil pump 8 to the retard chambers 201 through the hydraulic oil control valve 11. The advance supply oil passage RAs connects the oil pump 8 to the advance chambers 202 through the hydraulic oil control valve 11. The retard drain oil passage RRd, which serves as the drain oil passage, connects the retard chambers 201 to the oil pan 7. The advance drain oil passage RAd, which serves as the drain passage, connects the advance chambers 202 to the oil pan 7.

The retard supply oil passage RRs connects the oil pump 8 to the retard chambers 201 through the supply hole 101, the shaft hole 100, the cylindrical space St1, the axial supply oil passages RsA, the retard supply openings ORs, the limiting groove 511, the retard supply recess HRs, the retard openings OR and the retard oil passages 301.

The advance supply oil passage RAs connects the oil pump 8 to the advance chambers 202 through the supply hole 101, the shaft hole 100, the cylindrical space St1, the axial supply oil passages RsA, the advance supply openings OAs, the limiting groove 512, the advance supply recess HAs, the advance openings OA, and the advance oil passages 302.

The retard drain oil passage RRd connects the retard chambers 201 to the oil pan 7 through the retard oil passage 301, the retard openings OR, the retard drain recess HRd and the drain openings Od1, Od2.

The advance drain oil passage RAd connects the advance chambers 202 to the oil pan 7 through the advance oil passages 302, the advance openings OA, the advance drain recess HAd and the drain openings Od1, Od2.

Thus, a part of each of the retard supply oil passage RRs, the advance supply oil passage RAs, the retard drain oil passage RRd and the advance drain oil passage RAd is formed at the inside of the hydraulic oil control valve 11. Each axial supply oil passage RsA extends in the axial direction of the sleeve 400 in the advance supply oil passage RAs. Specifically, the sleeve 400 has the axial supply oil passages RsA, each of which extends in the axial direction of the sleeve 400 in the advance supply oil passage RAs.

The recycle oil passage Rre connects the retard drain oil passage RRd and the advance drain oil passage RAd (serving as the drain oil passages) to the retard supply oil passage RRs and the advance supply oil passage RAs. As shown in FIG. 3, the recycle oil passage Rre extends from the specific space Ss to the retard supply oil passage RRs and the advance supply oil passage RAs, i.e., the axial supply oil passages RsA through the recycle openings Ore, the movement limiting portion 513 and the annular flow passage Rri.

The retard drain oil passage RRd and the advance drain oil passage RAd (serving as the drain oil passages) are connected to the inside space of the spool 60 through the retard oil passages 301, the retard openings OR, the advance oil passages 302, the advance openings OA, the specific space Ss and the drain openings Od1.

Each drain opening Od1 is connected to the specific space Ss in the drain oil passage and extends from the specific space Ss in the radial direction of the sleeve 400 or the spool 60. Each of the recycle openings Ore is connected to the specific space Ss in the recycle oil passage Rre and extends from the specific space Ss toward the side that is opposite to the drain opening Od1. The recycle oil passage Rre is connected to the retard drain oil passage RRd and the advance drain oil passage RAd at the specific space Ss.

As shown in FIG. 3, at least a portion of each drain opening Od1 overlaps with each recycle opening Ore in the axial direction of the sleeve 400 or the spool 60. Moreover, each of the drain openings Od1 is formed at the spool 60 such that the drain opening Od1 extends from the specific space Ss toward the inner side in the radial direction of the sleeve 400 or the spool 60. Each of recycle openings Ore is formed at the inner sleeve 50 such that the recycle opening Ore extends from the specific space Ss toward the outer side in the radial direction of the sleeve 400 or the spool 60.

When the spool 60 is in contact with the retaining portion 59 (see FIG. 3), i.e., when the spool 60 is positioned at one end of the stroke range, the spool 60 opens the retard openings OR. Thereby, the oil pump 8 is communicated with the retard chambers 201 through the supply hole 101, the shaft hole 100, the cylindrical space St1, the axial supply oil passages RsA, the retard supply openings ORs, the limiting groove 511, the retard supply recess HRs, the retard openings OR and the retard oil passages 301 in the retard supply oil passage RRs. As a result, the hydraulic oil can be supplied from the oil pump 8 to the retard chambers 201 through the retard supply oil passage RRs. Moreover, at this time, the advance chambers 202 are communicated with the oil pan 7 through the advance oil passage 302, the advance openings OA, the advance drain recess HAd and the drain openings Od1, Od2 in the advance drain oil passage RAd. As a result, the hydraulic oil can be discharged from the advance chambers 202 to the oil pan 7 through the advance drain oil passage RAd.

When the spool 60 is positioned between the retaining portion 59 and the sleeve sealing portion 51, i.e., when the spool 60 is positioned in the middle of the stroke range, the oil pump 8 is communicated with the advance chambers 202 through the supply hole 101, the shaft hole 100, the cylindrical space St1, the axial supply oil passages RsA, the advance supply openings OAs, the limiting groove 512, the advance supply recess HAs, the advance openings OA and the advance oil passages 302 in the advance supply oil passage RAs. At this time, the oil pump 8 is communicated to the retard chambers 201 through the retard supply oil passage RRs. As a result, the hydraulic oil can be supplied from the oil pump 8 to the retard chambers 201 and the advance chambers 202 through the retard supply oil passage RRs and the advance supply oil passage RAs. However, the retard drain oil passage RRd and the advance drain oil passage RAd are closed, i.e., is blocked by the spool 60. Therefore, the hydraulic oil is not discharged from the retard chambers 201 and the advance chambers 202 to the oil pan 7.

When the spool 60 is in contact with the sleeve sealing portion 51, i.e., when the spool 60 is positioned at the other end of the stroke range, the retard chambers 201 are communicated with the oil pan 7 through the retard oil passages 301, the retard openings OR, the retard drain recess HRd and the drain openings Od1, Od2 in the retard drain passage RRd. At this time, the oil pump 8 is communicated with the advance chambers 202 through the advance supply oil passage RAs. As a result, the hydraulic oil can be discharged from the retard chambers 201 to the oil pan 7 through the retard drain oil passage RRd, and the hydraulic oil can be supplied from the oil pump 8 to the advance chambers 202 through the advance supply oil passage RAs.

A filter 58 is installed at an inside of the end part of the outer sleeve 40 located on the side where the sleeve sealing portion 51 is placed, i.e., the filter 58 is installed at the middle of the retard supply oil passage RRs and the advance supply oil passage RAs. The filter 58 is, for example, a mesh that is shaped in a circular disk form. The filter 58 can capture foreign objects contained in the hydraulic oil. Therefore, it is possible to limit flow of the foreign objects toward the downstream side of the filter 58, i.e., toward the side that is opposite to the oil pump 8.

Figure 5:
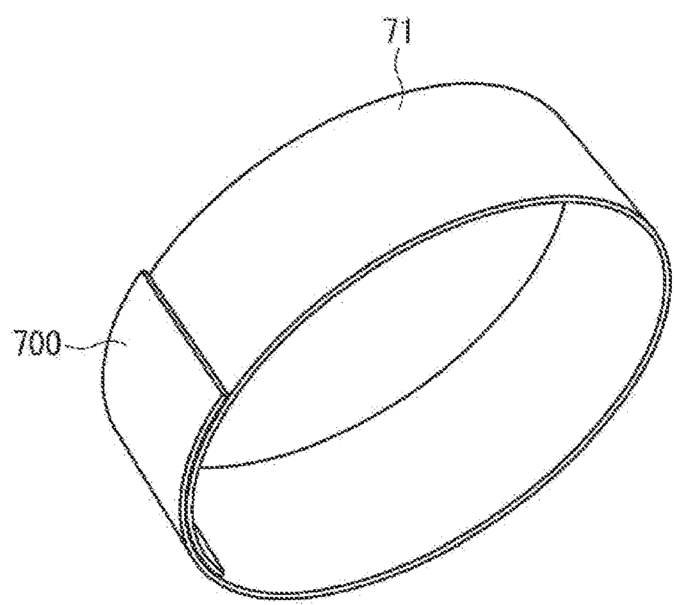
FIG. 5 is a perspective view of a retard supply check valve of the fluid control valve according to the first embodiment.

The retard supply check valve 71 is formed by rolling a rectangular metal thin plate such that a longitudinal direction of the rectangular metal thin plate coincides with the circumferential direction, so that the retard supply check valve 71 is shaped substantially in a cylindrical tubular form. Specifically, the retard supply check valve 71 is made of a resilient body that is shaped in a ring form. FIG. 5 is a perspective view of the retard supply check valve 71. The retard supply check valve 71 has an overlap portion 700. The overlap portion 700 is formed at one circumferential end portion of the retard supply check valve 71. The overlap portion 700 is formed to overlap with a radially outer side of the other circumferential end portion of the retard supply check valve 71 (see FIG. 5).

The retard supply check valve 71 is installed in the limiting groove 511. The retard supply check valve 71 is installed such that the retard supply check valve 71 is resiliently deformable in the radial direction in the limiting groove 511. The retard supply check valve 71 is located on the radially inner side of the retard supply openings ORs in the radial direction of the inner sleeve 50. The retard supply check valve 71 is installed in the limiting groove 511 as follows. That is, in a state where the hydraulic oil does not flow in the retard supply oil passage RRs, i.e., in a state where an external force is not applied to the retard supply check valve 71, the overlap portion 700 overlaps with the other circumferential end portion of the retard supply check valve 71.

When the hydraulic oil flows from the retard supply openings ORs toward the retard supply recess HRs in the retard supply oil passage RRs, the retard supply check valve 71 is deformed such that the outer peripheral wall of the retard supply check valve 71 is radially inwardly urged by the hydraulic oil and shrinks radially inward, i.e., a diameter of the retard supply check valve 71 is reduced. Therefore, the outer peripheral wall of the retard supply check valve 71 is spaced away from the retard supply openings ORs to place the retard supply check valve 71 in the valve opening state, so that the hydraulic oil can flow toward the retard supply recess HRs through the retard supply check valve 71. At this time, the overlap portion 700 maintains a state in which a part of the overlap portion 700 overlaps with the other circumferential end portion of the retard supply check valve 71 while a length of the overlapping range, in which the overlap portion 700 overlaps with the other circumferential end portion of the retard supply check valve 71, is increased.

When the flow rate of the hydraulic oil, which flows through the retard supply oil passage RRs, becomes lower than or equal to a predetermined value, the retard supply check valve 71 is deformed to expand radially outward, i.e., the diameter of the retard supply check valve 71 is increased.

When the hydraulic oil flows from the retard supply recess HRs toward the retard supply openings ORs, the inner peripheral wall of the retard supply check valve 71 is radially outwardly urged by the hydraulic oil. Thereby, the retard supply check valve 71 contacts the retard supply openings ORs and is thereby placed in the valve closing state. In this way, the flow of the hydraulic oil from the retard supply recess HRs toward the retard supply openings ORs is limited.

As discussed above, the retard supply check valve 71 functions as a check valve such that the retard supply check valve 71 enables the flow of the hydraulic oil from the retard supply openings ORs toward the retard supply recess HRs and limits the flow of the hydraulic oil from the retard supply recess HRs toward the retard supply openings ORs. Specifically, the retard supply check valve 71 is located on the oil pump 8 side of the spool 60 of the hydraulic oil control valve 11 in the retard supply oil passage RRs, and the retard supply check valve 71 enables only the flow of the hydraulic oil from the oil pump 8 side toward the retard chambers 201.

Similar to the retard supply check valve 71, the advance supply check valve 72 is formed by rolling a rectangular metal thin plate such that a longitudinal direction of the rectangular metal thin plate coincides with the circumferential direction, so that the advance supply check valve 72 is shaped in a substantially cylindrical tubular form. The structure of the advance supply check valve 72 is similar to that of the retard supply check valve 71 and thus will not be described in detail.

The advance supply check valve 72 is installed in the limiting groove 512. The advance supply check valve 72 is installed such that the advance supply check valve 72 is resiliently deformable in the radial direction in the limiting groove 512. The advance supply check valve 72 is located on the radially inner side of the advance supply openings OAs in the radial direction of the inner sleeve 50. The advance supply check valve 72 is installed in the limiting groove 512 as follows. That is, in a state where the hydraulic oil does not flow in the advance supply oil passage RAs, i.e., in a state where an external force is not applied to the advance supply check valve 72, the overlap portion 700 overlaps with the other circumferential end portion of the advance supply check valve 72.

When the hydraulic oil flows from the advance supply openings OAs toward the advance supply recess HAs in the advance supply oil passage RAs, the advance supply check valve 72 is deformed such that the outer peripheral wall of the advance supply check valve 72 is radially inwardly urged by the hydraulic oil and shrinks radially inward, i.e., a diameter of the advance supply check valve 72 is reduced. Therefore, the outer peripheral wall of the advance supply check valve 72 is spaced away from the advance supply openings OAs to place the advance supply check valve 72 in the valve opening state, so that the hydraulic oil can flow toward the advance supply recess HAs through the advance supply check valve 72. At this time, the overlap portion 700 maintains a state in which a part of the overlap portion 700 overlaps with the other circumferential end portion of the advance supply check valve 72 while a length of the overlapping range, in which the overlap portion 700 overlaps with the other circumferential end portion of the advance supply check valve 72, is increased.

When the flow rate of the hydraulic oil, which flows through the advance supply oil passage RAs, becomes lower than or equal to a predetermined value, the advance supply check valve 72 is deformed to expand radially outward, i.e., the diameter of the advance supply check valve 72 is increased. When the hydraulic oil flows from the advance supply recess HAs toward the advance supply openings OAs, the inner peripheral wall of the advance supply check valve 72 is radially outwardly urged by the hydraulic oil. Thus, the advance supply check valve 72 contacts the advance supply openings OAs and is thereby placed in the valve closing state. In this way, the flow of the hydraulic oil from the advance supply recess HAs toward the advance supply openings OAs is limited.

As discussed above, the advance supply check valve 72 functions as the check valve such that the advance supply check valve 72 enables the flow of the hydraulic oil from the advance supply openings OAs to the advance supply recess HAs and limits the flow of the hydraulic oil from the advance supply recess HAs to the advance supply openings OAs. Specifically, the advance supply check valve 72 is located on the oil pump 8 side of the spool 60 of the hydraulic oil control valve 11 in the advance supply oil passage RAs, and the advance supply check valve 72 enables only the flow of the hydraulic oil from the oil pump 8 side toward the advance chamber 202.

Similar to the retard supply check valve 71, the recycle check valve 81, which serves as the check valve, is formed by rolling a rectangular metal thin plate such that a longitudinal direction of the rectangular metal thin plate coincides with the circumferential direction, so that the recycle check valve 81 is shaped substantially in a cylindrical tubular form. Specifically, the recycle check valve 81 is made of a resilient body that is shaped in a ring form. The recycle check valve 81 is formed such that the outer diameter of the recycle check valve 81 is larger than the outer diameter of the retard supply check valve 71. The structure of the recycle check valve 81 is similar to that of the retard supply check valve 71 except a difference in the outer diameter, so that the structure of the recycle check valve 81 will not be described in detail.

The recycle check valve 81 is installed in the movement limiting portion 513, i.e., is installed at the annular flow passage Rri in the recycle oil passages Rre. The recycle check valve 81 is installed such that the recycle check valve 81 is resiliently deformable in the radial direction at the annular flow passage Rri. The recycle check valve 81 is located on the radially outer side of the valve seat surface 55 in the radial direction of the inner sleeve 50. The recycle check valve 81 is installed in the annular flow passage Rri such that in the state where the hydraulic oil does not flow in the recycle oil passage Rre, i.e., in the state where the external force is not applied to the recycle check valve 81, the overlap portion 700 overlaps with the other circumferential end portion of the recycle check valve 81 (see FIG. 6).

When the hydraulic oil flows from the recycle openings Ore to the annular flow passage Rri in the recycle oil passage Rre, the recycle check valve 81 is deformed such that the inner peripheral wall of the recycle check valve 81 is radially outwardly urged by the hydraulic oil and expands radially outward, i.e., the diameter of the recycle check valve 81 is increased. Therefore, the inner peripheral wall of the recycle check valve 81 is spaced away from the valve seat surface 55 to place the recycle check valve 81 in the valve opening state, so that the hydraulic oil can flow toward the annular flow passage Rri through the recycle check valve 81 (see FIG. 7). At this time, the overlap portion 700 maintains the state in which a part of the overlap portion 700 overlaps with the other circumferential end portion of the recycle check valve 81 while the length of the overlapping range, in which the overlap portion 700 overlaps with the other circumferential end portion of the recycle check valve 81, is reduced.

When the flow rate of the hydraulic oil, which flows in the recycle oil passage Rre, becomes lower than or equal to a predetermined value, the recycle check valve 81 is deformed to shrink radially inward, i.e., a diameter of the recycle check valve 81 is reduced. When the hydraulic oil flows from the annular flow passage Rri toward the recycle openings Ore, the outer peripheral wall of the recycle check valve 81 is radially inwardly urged by the hydraulic oil, and thereby the recycle check valve 81 contacts the valve seat surface 55 to place the recycle check valve 81 in the valve closing state. Thereby, the flow of the hydraulic oil from the annular flow passage Rri toward the recycle openings Ore is limited.

As discussed above, the recycle check valve 81 functions as a check valve such that the recycle check valve 81 enables the flow of the hydraulic oil from the recycle openings Ore to the annular flow passage Rri and limits the flow of the hydraulic oil from the annular flow passage Rri to the recycle openings Ore. That is, the recycle check valve 81 enables only the flow of the hydraulic oil from the drain oil passage to the retard supply oil passage RRs and the advance supply oil passage RAs in the recycle oil passage Rre. The movement limiting portion 513 can limit axial movement of the recycle check valve 81.

The displacement limiter 90 includes a limiter main body 91 and a plurality of limiter flow passages 92 (see FIG. 6). The limiter main body 91 is formed by winding a corrugated plate material into a ring form. In the present embodiment, the limiter main body 91 is formed by a plate material made of, for example, metal and is shaped in a cylindrical tubular form. The limiter main body 91 is placed on the outer side of the recycle check valve 81 in the annular flow passage Rri. An axial length of the limiter main body 91, which is measured in the axial direction, is substantially the same as an axial length of the recycle check valve 81. Here, an outer periphery of the limiter main body 91 is configured to contact the inner peripheral wall of the outer sleeve 40.

When the diameter of the recycle check valve 81 is increased to place the recycle check valve 81 in the valve opening state, an inner periphery of the limiter main body 91 contacts the outer peripheral wall of the recycle check valve 81 to limit the displacement of the recycle check valve 81 in a diameter increasing direction that is defined as a direction for increasing a diameter of the recycle check valve 81. (see FIG. 7). Here, the limiter main body 91 is resiliently deformable in a radial direction of the annular flow passage Rri.

Figure 7:
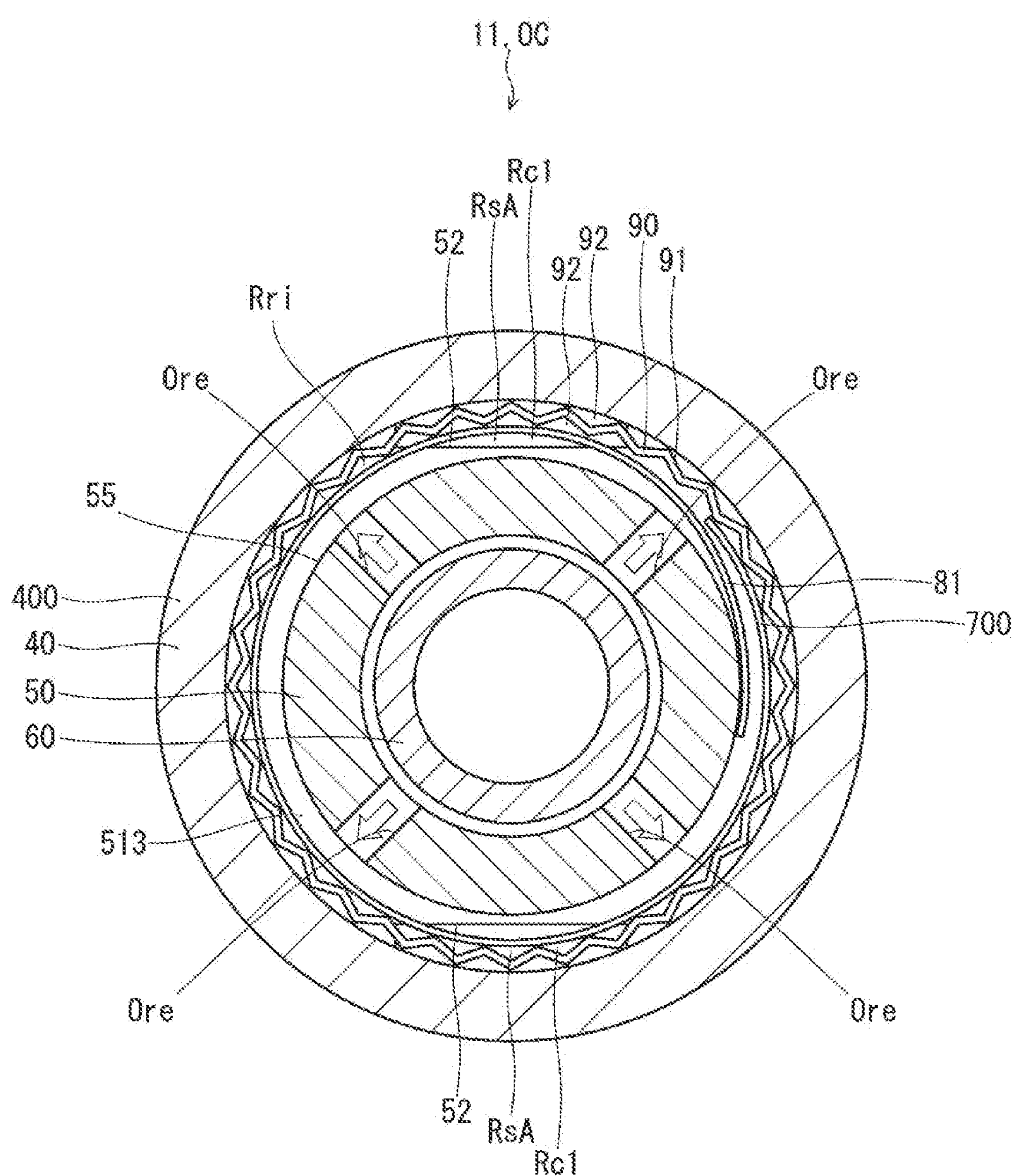
FIG. 7 is a cross-sectional view showing a state of a check valve of the fluid control valve in a valve opening initial stage according to the first embodiment.

When the limiter main body 91 is made of the corrugated plate material, the plurality of limiter flow passages 92 is formed at the inside and the outside of the limiter main body 91 (see FIGS. 6 and 7). Each of the limiter flow passages 92 is configured to communicate between one side and the other side of the limiter main body 91 in the axial direction of the sleeve 400, so that the hydraulic oil can flow through the limiter flow passage 92. Here, at least a portion of the limiter main body 91 is located at each of connections Rc1, at each of which the annular flow passage Rri and a corresponding one of the axial supply oil passages RsA are connected with each other. Therefore, the hydraulic oil, which flows in the axial supply oil passage RsA, can flow along the limiter flow passages 92, and thereby the interference of the flow of the hydraulic oil by the displacement limiter 90 placed in the annular flow passage Rri is limited.

Figure 8:
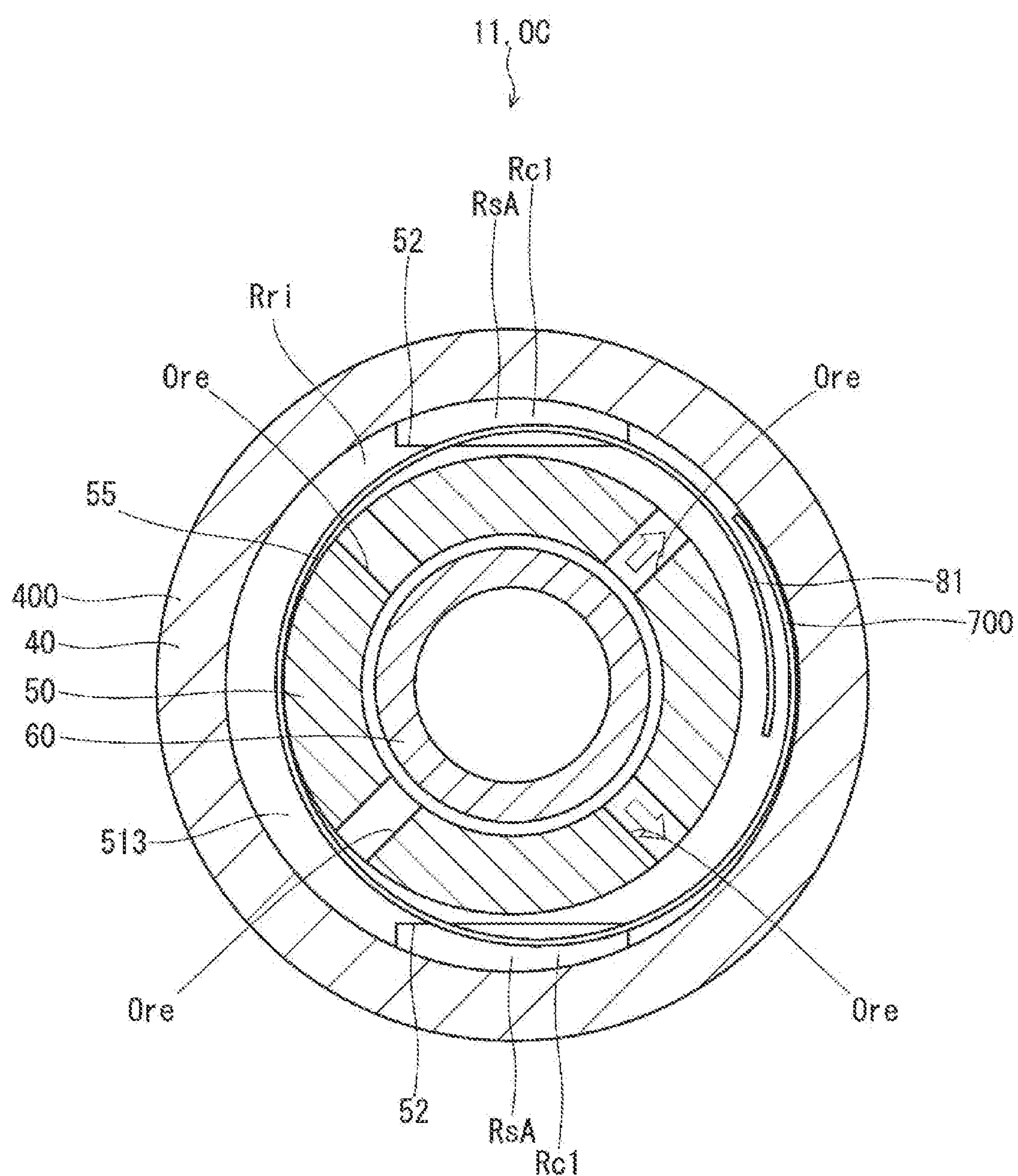
FIG. 8 is a diagram showing a state of a check valve of a fluid control valve of a comparative example in a valve opening initial stage.

FIG. 8 shows a fluid control valve of a comparative example. The fluid control valve of the comparative example has the same structure as the hydraulic oil control valve 11 of the present embodiment except that the fluid control valve of the comparative example does not have the displacement limiter 90. Since the fluid control valve of the comparative example does not have the displacement limiter 90, the recycle check valve 81 may possibly be excessively deformed and damaged when the diameter of the recycle check valve 81 is increased to place the recycle check valve 81 in the valve opening state (see FIG. 8). Further, at the valve opening initial stage of the recycle check valve 81 (see FIG. 8), a pressure loss may possibly be increased due to non-uniform valve opening of the recycle check valve 81 that is not uniform in the circumferential direction of the recycle check valve 81.

In contrast, since the hydraulic oil control valve 11 of the present embodiment has the displacement limiter 90, the excessive deformation of the recycle check valve 81 can be limited to limit the damage of the recycle check valve 81 when the diameter of the recycle check valve 81 is increased to place the recycle check valve 81 in the valve opening state (see FIG. 7). Further, at the valve opening initial stage of the recycle check valve 81 (see FIG. 7), a pressure loss can be reduced by limiting the non-uniform valve opening of the recycle check valve 81 that is not uniform in the circumferential direction.

Figure 9:
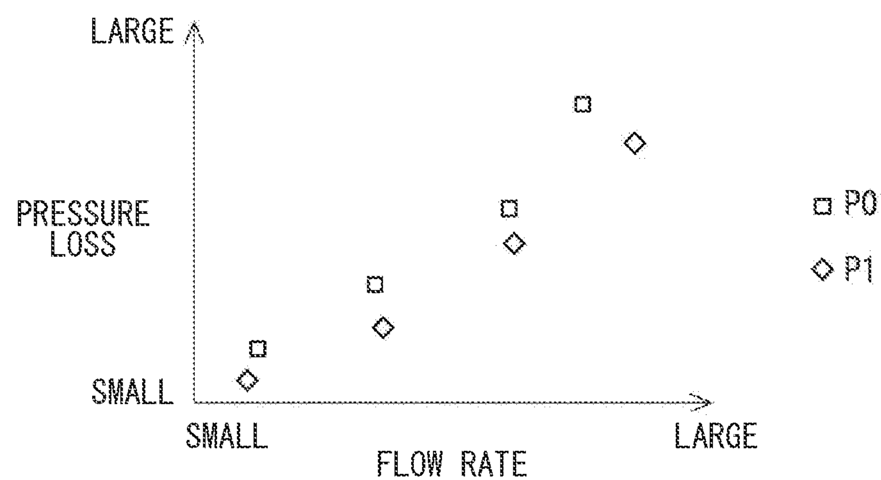
FIG. 9 is a diagram indicating a relationship between a flow rate of the hydraulic oil and a pressure loss of the hydraulic oil in the valve opening initial stage of the check valve for the first embodiment and the comparative example.

FIG. 9 is a diagram showing experimental results of the present embodiment and the comparative example with respect to a relationship between a flow rate of the hydraulic oil and the pressure loss of the hydraulic oil at the valve opening initial stage of the recycle check valve 81. In FIG. 9, P0 indicates the experimental result of the comparative example, and P1 indicates the experimental result of the present embodiment. As indicated in FIG. 9, at the valve opening initial stage of the recycle check valve 81, the pressure loss of the present embodiment is smaller than the pressure loss of the comparative example regardless of the flow rate of the hydraulic oil.

Figure 10:
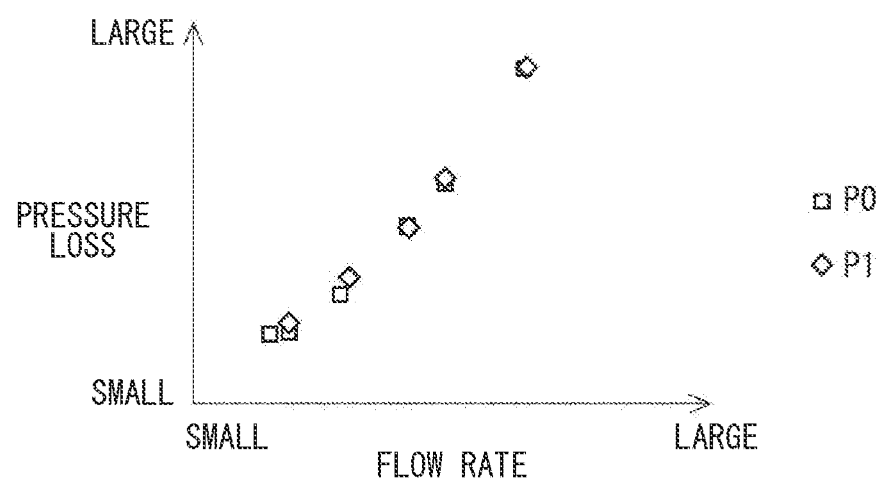
FIG. 10 is a diagram indicating a relationship between the flow rate of the hydraulic oil and the pressure loss of the hydraulic oil in a state where the flow rate of the hydraulic oil becomes constant after elapse of a predetermined time period from the valve opening time of the check valve for the first embodiment and the comparative example.

FIG. 10 is a diagram showing experimental results of the present embodiment and the comparative example with respect to a relationship between the flow rate of the hydraulic oil and the pressure loss of the hydraulic oil in a state where the flow rate of the hydraulic oil becomes constant after elapse of a predetermined time period from the valve opening time of the recycle check valve 81. In FIG. 10, P0 indicates the experimental result of the comparative example, and P1 indicates the experimental result of the present embodiment. As shown in FIG. 10, in the state where the flow rate of the hydraulic oil becomes constant after elapse of the predetermined time period from the valve opening time of the recycle check valve 81, there is no difference between the pressure loss of the comparative example and the pressure loss of the present embodiment.

As discussed above, it is understood that the present embodiment is highly effective particularly for limiting the pressure loss of the hydraulic oil at the valve opening initial stage of the recycle check valve 81.

A linear solenoid 9 is located on a side of the spool 60, which is opposite to the camshaft 3. The linear solenoid 9 is configured to contact the spool sealing portion 62. When the linear solenoid 9 is energized, the linear solenoid 9 urges the spool 60 toward the camshaft 3 through the spool sealing portion 62 against the urging force of the spring 63. As a result, the position of the spool 60 in the axial direction relative to the sleeve 400 changes in the stroke range.

The variable volume space Sv is communicated with the retard drain passage RRd and the advance drain passage RAd. The variable volume space Sv is thus opened to the atmosphere through the drain openings Od2 of the retard drain passage RRd and the advance drain passage RAd. As a result, the pressure in the variable volume space Sv can be made equal to the atmospheric pressure. This allows for smooth movement of the spool 60 in the axial direction.

Next, a change in the flow of the hydraulic oil induced by a change in the position of the spool 60 relative to the sleeve 400 will be described.

When the spool 60 is in contact with the retaining portion 59, i.e., when the spool 60 is positioned at the one end of the stroke range, the hydraulic oil is supplied from the oil pump 8 to the retard chambers 201 through the retard supply oil passage RRs. At this time, the hydraulic oil is discharged from the advance chambers 202 to the oil pan 7 through the advance drain passage RAd. Moreover, a portion of the hydraulic oil, which flows in the advance drain oil passage RAd, is returned to the axial supply oil passage RsA side and the retard supply oil passage RRs side through the recycle oil passage Rre. As a result, the hydraulic oil, which is discharged from the advance chambers 202, can be reused. At this time, the recycle check valve 81 limits backflow of the hydraulic oil from the axial supply oil passage RsA to the drain oil passage in the recycle oil passage Rre.

When the spool 60 is positioned between the retaining portion 59 and the sleeve sealing portion 51, i.e., when the spool 60 is positioned in the middle of the stroke range, the hydraulic oil is supplied from the oil pump 8 to the retard chambers 201 through the retard supply oil passage RRs. At this time, the hydraulic oil is supplied from the oil pump 8 to the advance chambers 202 through the advance supply oil passage RAs. At this time, the retard drain oil passage RRd and the advance drain oil passage RAd are closed by the spool 60, so that the hydraulic oil does not flow to the drain oil passage and is not returned to the axial supply oil passage RsA through the recycle oil passage Rre.

When the spool 60 is in contact with the sleeve sealing portion 51, i.e., when the spool 60 is positioned at the other end of the stroke range, the hydraulic oil is supplied from the oil pump 8 to the advance chambers 202 through the advance supply oil passage RAs. At this time, the hydraulic oil is discharged from the retard chambers 201 to the oil pan 7 through the retard drain passage RRd. Moreover, a portion of the hydraulic oil, which flows in the retard drain oil passage RRd, is returned to the axial supply oil passage RsA side and the advance supply oil passage RAs side through the recycle oil passage Rre. As a result, the hydraulic oil, which is discharged from the retard chambers 201, can be reused. At this time, the recycle check valve 81 limits backflow of the hydraulic oil from the axial supply oil passage RsA to the drain oil passage in the recycle oil passage Rre.

In the present embodiment, a lock pin 33 is further provided (see FIGS. 1 and 2). The lock pin 33 is shaped in a bottomed cylindrical tubular form. The lock pin 33 is received in a receiving hole 321 formed at the vane 32 in such a manner that the lock pin 33 can axially reciprocate in the receiving hole 321. A spring 34 is installed in an inside of the lock pin 33. The spring 34 urges the lock pin 33 toward the plate portion 222 of the case 22. A fitting recess 25 is formed at the plate portion 222 of the case 22 on the vane 32 side of the plate portion 222.

The lock pin 33 can be fitted into the fitting recess 25 when the vane rotor 30 is held at a most retarded position relative to the housing 20. When the lock pin 33 is fitted into the fitting recess 25, relative rotation of the vane rotor 30 relative to the housing 20 is limited. On the other hand, when the lock pin 33 is not fitted into the fitting recess 25, the relative rotation of the vane rotor 30 relative to the housing 20 is enabled.

A pin control oil passage 304, which is communicated with a corresponding one of the advance chambers 202, is formed in the vane 32 at a location between the lock pin 33 and the advance chamber 202 (see FIG. 2). The pressure of the hydraulic oil, which flows from the advance chamber 202 into the pin control oil passage 304, is exerted in a removing direction for removing the lock pin 33 from the fitting recess 25 against the urging force of the spring 34.

In the valve timing adjusting device 10 constructed in the above-described manner, when the hydraulic oil is supplied to the advance chambers 202, the hydraulic oil flows into the pin control oil passage 304. Thus, the lock pin 33 is removed from the fitting recess 25, and thereby the relative rotation of the vane rotor 30 relative to the housing 20 is enabled.

Next, the operation of the valve timing adjusting device 10 will be described. The valve timing adjusting device 10 drives the hydraulic oil control valve 11 among a first operating state, a second operating state and a phase holding state when the linear solenoid 9 is driven to urge the spool 60 of the hydraulic oil control valve 11. In the first operating state of the hydraulic oil control valve 11, the oil pump 8 is connected to the retard chambers 201, and the advance chambers 202 are connected to the oil pan 7. In the second operating state of the hydraulic oil control valve 11, the oil pump 8 is connected to the advance chambers 202, and the retard chambers 201 are connected to the oil pan 7. In the phase holding state of the hydraulic oil control valve 11, the oil pump 8 is connected to the retard chambers 201 and the advance chambers 202, and the connection of the retard chambers 201 to the oil pan 7 and the connection of the advance chambers 202 to the oil pan 7 are blocked to maintain the current phase of the phase converter PC.

In the first operating state, the hydraulic oil is supplied to the retard chambers 201 through the retard supply oil passage RRs, and the hydraulic oil is returned from the advance chambers 202 to the oil pan 7 through the advance drain passage RAd. In addition, the hydraulic oil is returned from the advance drain oil passage RAd to the retard supply oil passage RRs through the recycle oil passage Rre.

In the second operating state, the hydraulic oil is supplied to the advance chambers 202 through the advance supply oil passage RAs, and the hydraulic oil is returned from the retard chambers 201 to the oil pan 7 through the retard drain oil passage RRd. In addition, the hydraulic oil is returned from the retard drain oil passage RRd to the advance supply oil passage RAs through the recycle oil passage Rre.

In the phase holding state, the hydraulic oil is supplied to the retard chambers 201 and the advance chambers 202 through the retard supply oil passage RRs and the advance supply oil passage RAs, and the discharge of the hydraulic oil from the retard chambers 201 and the advance chambers 202 is limited.

The valve timing adjusting device 10 brings the hydraulic oil control valve 11 into the first operating state when the rotational phase of the camshaft 3 is on the advance side of a target value. As a result, the vane rotor 30 undergoes relative rotation in the retarding direction relative to the housing 20, so that the rotational phase of the camshaft 3 shifts to the retard side.

The valve timing adjusting device 10 brings the hydraulic oil control valve 11 into the second operating state when the rotational phase of the camshaft 3 is on the retard side of the target value. As a result, the vane rotor 30 undergoes relative rotation in the advancing direction relative to the housing 20, so that the rotational phase of the camshaft 3 shifts to the advance side.

The valve timing adjusting device 10 brings the hydraulic oil control valve 11 into the phase holding state when the rotational phase of the camshaft 3 coincides with the target value. In this way, the rotational phase of the camshaft 3 is maintained.

In the present embodiment, when the hydraulic oil control valve 11 is in the first operating state or the second operating state, the hydraulic oil is returned from the drain oil passage side to the retard supply oil passage RRs or the advance supply oil passage RAs through the recycle oil passage Rre. In this way, the hydraulic oil, which is discharged from the advance chamber 202 or the retard chamber 201, can be reused.

Moreover, when the hydraulic oil control valve 11 is in the first operating state or the second operating state, the recycle check valve 81 limits backflow of the hydraulic oil from each supply oil passage toward the drain oil passage in the recycle oil passage Rre.

Furthermore, in the present embodiment, the hydraulic oil can be supplied to the retard chambers 201 and the advance chambers 202 even when the hydraulic oil control valve 11 is in the phase holding state, i.e., when the current phase of the phase converter PC is maintained. In other words, at the time of maintaining the current phase of the phase converter PC, the hydraulic oil control valve 11 can maintain the supply of the hydraulic oil to the retard chambers 201 and the advance chambers 202 to limit phase fluctuations of the phase converter PC, which would be caused by the air drawn into the retard chambers 201 and the advance chambers 202.

In the present embodiment, when the hydraulic oil control valve 11 is in the first operating state or the second operating state, a valve opening and closing operation of the recycle check valve 81 is repeated. In the present embodiment, since the displacement limiter 90 is provided, it is possible to limit the excessive deformation of the recycle check valve 81 and the damage of the recycle check valve 81.

Furthermore, in the present embodiment, it is possible to limit the pressure loss of the hydraulic oil at the valve opening initial stage of the recycle check valve 81. Therefore, the hydraulic oil control valve 11 of the present embodiment is suitable for the valve timing adjusting device 10 that repeats the valve opening initial stage of the recycle check valve 81.

Furthermore, in the present embodiment, the hydraulic oil control valve 11 is placed at the center part of the phase converter PC, i.e., is placed along the rotational axis of the phase converter PC. Therefore, at the time of operating the engine 1, a centrifugal force acts on the recycle check valve 81. Thereby, the position and the valve opening and closing operation of the recycle check valve 81 in the annular flow passage Rri may possibly become unstable. However, in the present embodiment, the position and the valve opening and closing operation of the recycle check valve 81 in the annular flow passage Rri can be stabilized with the displacement limiter 90.

As discussed above, according to the present embodiment, there is provided the hydraulic oil control valve 11 configured to control the flow of fluid supplied from the hydraulic oil supply source OS to the hydraulic chambers which serve as the fluid supply destination. The hydraulic oil control valve 11 includes: the outer sleeve 40, which serves as the outer tubular portion; the inner sleeve 50, which serves as the inner tubular portion; the axial supply oil passage RsA, which serves as the axial flow passage; the annular flow passage Rri, the valve seat surface 55; the recycle opening Ore, which serves as the valve seat flow passage; the recycle check valve 81, which serves as the check valve; and the displacement limiter 90.

The inner sleeve 50 is located at the inside of the outer sleeve 40. The axial supply oil passage RsA is located between the outer sleeve 40 and the inner sleeve 50 and extends in the axial direction of the outer sleeve 40 and the inner sleeve 50 such that the axial supply oil passage RsA conducts the fluid that flows from the hydraulic oil supply source OS to the retard chambers 201 and the advance chambers 202, which serve as the hydraulic chambers. The annular flow passage Rri is located between the outer sleeve 40 and the inner sleeve 50 and is shaped in the annular form to extend in the circumferential direction of the outer sleeve 40 and the inner sleeve 50 while the annular flow passage Rri is connected to the axial supply oil passage RsA. The valve seat surface 55 is shaped in the cylindrical form and is formed at the inner sleeve 50 in the annular flow passage Rri. The recycle opening Ore communicates between the valve seat surface 55 and the inside of the inner sleeve 50.

The recycle check valve 81 is made of the resilient body wound in the ring form and is located in the annular flow passage Rri. The recycle check valve 81 is placed in the valve opening state to enable the flow of hydraulic oil from the recycle openings Ore to the annular flow passage Rri when the diameter of the recycle check valve 81 is increased in the diameter increasing direction to lift the recycle check valve 81 away from the valve seat surface 55, and the recycle check valve 81 is placed in the valve closing state to limit the flow of the hydraulic oil from the annular flow passage Rri to the recycle openings Ore when the diameter of the recycle check valve 81 is decreased to seat the recycle check valve 81 against the valve seat surface 55. The displacement limiter 90 includes: the limiter main body 91 that is located on the outer side of the recycle check valve 81 in the annular flow passage Rri and is configured to limit displacement of the recycle check valve 81 in the diameter increasing direction of the recycle check valve 81; and the limiter flow passage 92 that communicates between one side and another side of the limiter main body 91 in the axial direction of the outer sleeve 40 and the inner sleeve 50 to enable the fluid to flow between the one side and the another side of the limiter main body 91 through the limiter flow passage 92.

In the present embodiment, the limiter main body 91 of the displacement limiter 90 is configured to limit the displacement of the recycle check valve 81 in the diameter increasing direction of the recycle check valve 81. Therefore, it is possible to limit occurrence of the damage caused by the excessive deformation of the recycle check valve 81. Furthermore, the displacement limiter 90 includes the limiter flow passages 92 each of which is configured to communicate between the one side and the other side of the limiter main body 91 in the axial direction of the outer sleeve 40 and the inner sleeve 50, so that the hydraulic oil can flow through the limiter flow passages 92. Therefore, the hydraulic oil, which flows in the axial supply oil passage RsA, can flow along the limiter flow passages 92, and thereby the interference of the flow of the hydraulic oil by the displacement limiter 90 placed in the annular flow passage Rri is limited. Thus, it is possible to limit a decrease in the flow rate of the hydraulic oil supplied to the retard chambers 201 and the advance chambers 202 which serve as the hydraulic chambers.

Furthermore, in the present embodiment, the limiter main body 91 is formed by the corrugated plate material that is wound in the ring form. Therefore, the displacement limiter 90, which includes the limiter flow passages 92, can be relatively easily formed.

Furthermore, in the present embodiment, the limiter main body 91 is resiliently deformable in the radial direction of the annular flow passage Rri. Therefore, it is possible to reduce an impact that is generated by collision between the recycle check valve 81 and the limiter main body 91 when the displacement limiter 90 limits the displacement of the recycle check valve 81 in the diameter increasing direction. As a result, wear and damage of the recycle check valve 81 and the limiter main body 91 can be limited.

Furthermore, in the present embodiment, the spool 60 is further provided. The spool 60 is located at the inside of the inner sleeve 50 and is configured to move in the axial direction relative to the inner sleeve 50. The spool 60 is configured to control the flow of the fluid between the hydraulic oil supply source OS and the retard and advance chambers 201, 202 (serving as the hydraulic chambers) according to the position of the spool 60 in the axial direction relative to the inner sleeve 50. In the present embodiment, at the time of controlling the flow of the hydraulic oil with the spool 60, the inner sleeve 50, the recycle check valve 81 and the displacement limiter 90 are not moved relative to the outer sleeve 40. Therefore, the position and the valve opening and closing operation of the recycle check valve 81 are stabilized.

Furthermore, according to the present embodiment, there is provided the valve timing adjusting device 10 configured to adjust the valve timing of the engine 1. The valve timing adjusting device 10 includes the phase converter PC and the hydraulic oil control valve 11 (serving as the hydraulic oil control valve).

The phase converter PC is installed to the camshaft 3 of the engine 1 such that the phase converter PC is rotatable synchronously with the crankshaft 2 of the engine 1. The phase converter PC includes the retard chambers 201 and the advance chambers 202 which serve as the hydraulic chambers, and the phase converter PC is configured to shift the phase between the crankshaft 2 and the camshaft 3 by the hydraulic oil supplied to the retard chambers 201 and the advance chambers 202. The hydraulic oil control valve 11 controls the hydraulic oil, which is supplied from the hydraulic oil supply source OS to the retard chambers 201 and the advance chambers 202.

In the present embodiment, the displacement limiter 90 can limit a decrease in the flow rate of the hydraulic oil supplied to the retard chambers 201 and the advance chambers 202 (serving as the hydraulic chambers) and can limit damage of the recycle check valve 81.

Furthermore, in the present embodiment, it is possible to limit the pressure loss of the hydraulic oil at the valve opening initial stage of the recycle check valve 81. Therefore, the hydraulic oil control valve 11 of the present embodiment is suitable for the valve timing adjusting device 10 that repeats the valve opening initial stage of the recycle check valve 81.

Furthermore, in the present embodiment, the hydraulic oil control valve 11 is installed at the center part of the phase converter PC. Thus, at the time of operating the engine 1, the recycle check valve 81 is rotated, and the centrifugal force acts on the recycle check valve 81. Thereby, the position and the valve opening and closing operation of the recycle check valve 81 in the annular flow passage Rri may possibly become unstable. However, in the present embodiment, the position and the valve opening and closing operation of the recycle check valve 81 in the annular flow passage Rri can be stabilized with the displacement limiter 90.

Second Embodiment

Figure 11:
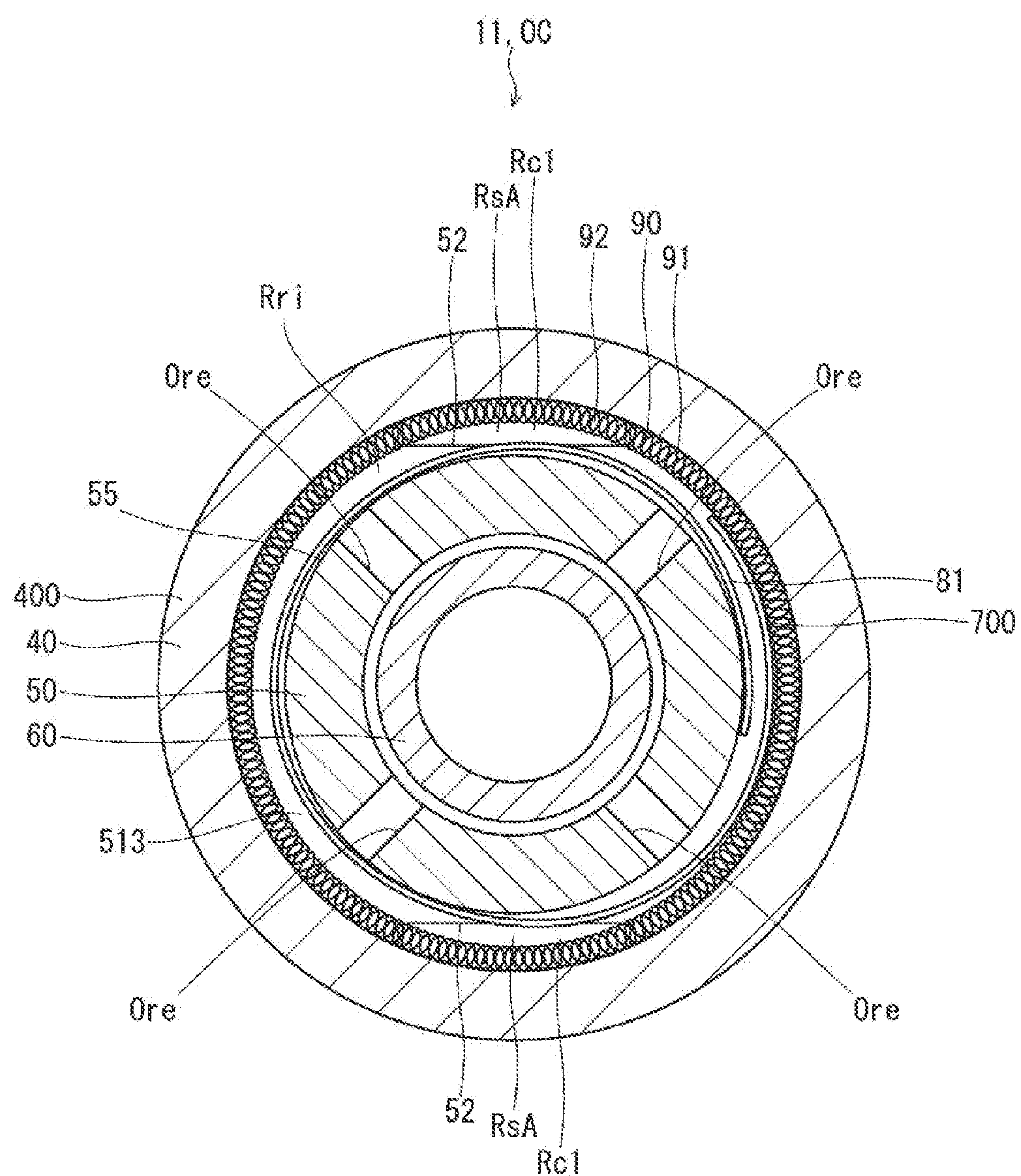
FIG. 11 is a cross-sectional view showing a check valve and a displacement limiter of a fluid control valve according to a second embodiment.

FIG. 11 shows a fluid control valve according to a second embodiment. The second embodiment differs from the first embodiment with respect to the structure of the displacement limiter 90.

In the present embodiment, the limiter main body 91 is formed by a spirally wound wire material that is further wound in a ring form. In the present embodiment, a wire material made of, for example, metal is spirally wound into a coil form and is further wound into a ring form to form the limiter main body 91. The limiter main body 91 is placed on the outer side of the recycle check valve 81 in the annular flow passage Rri. Here, an outer periphery of the limiter main body 91 is configured to contact the inner peripheral wall of the outer sleeve 40.

When the diameter of the recycle check valve 81 is increased to place the recycle check valve 81 in the valve opening state, an inner periphery of the limiter main body 91 contacts the outer peripheral wall of the recycle check valve 81 to limit the displacement of the recycle check valve 81 in the diameter increasing direction. Here, the limiter main body 91 is resiliently deformable in a radial direction of the annular flow passage Rri.

When the limiter main body 91 is made of the spirally wound wire material, a plurality of limiter flow passages 92 is formed at the limiter main body 91 (see FIG. 11). Each of the limiter flow passages 92 is configured to communicate between one side and the other side of the limiter main body 91 in the axial direction of the sleeve 400, so that the hydraulic oil can flow through the limiter flow passage 92. Here, at least a portion of the limiter main body 91 is located at each of connections Rc1, at each of which the annular flow passage Rri and a corresponding one of the axial supply oil passages RsA are connected with each other. Therefore, the hydraulic oil, which flows in the axial supply oil passage RsA, can flow along the limiter flow passages 92, and thereby the interference of the flow of the hydraulic oil by the displacement limiter 90 placed in the annular flow passage Rri is limited.

As described above, in the present embodiment, the limiter main body 91 is formed by further winding the spirally wound wire material into the ring form. Therefore, the displacement limiter 90, which includes the limiter flow passages 92, can be relatively easily formed.

Third Embodiment

Figure 12:
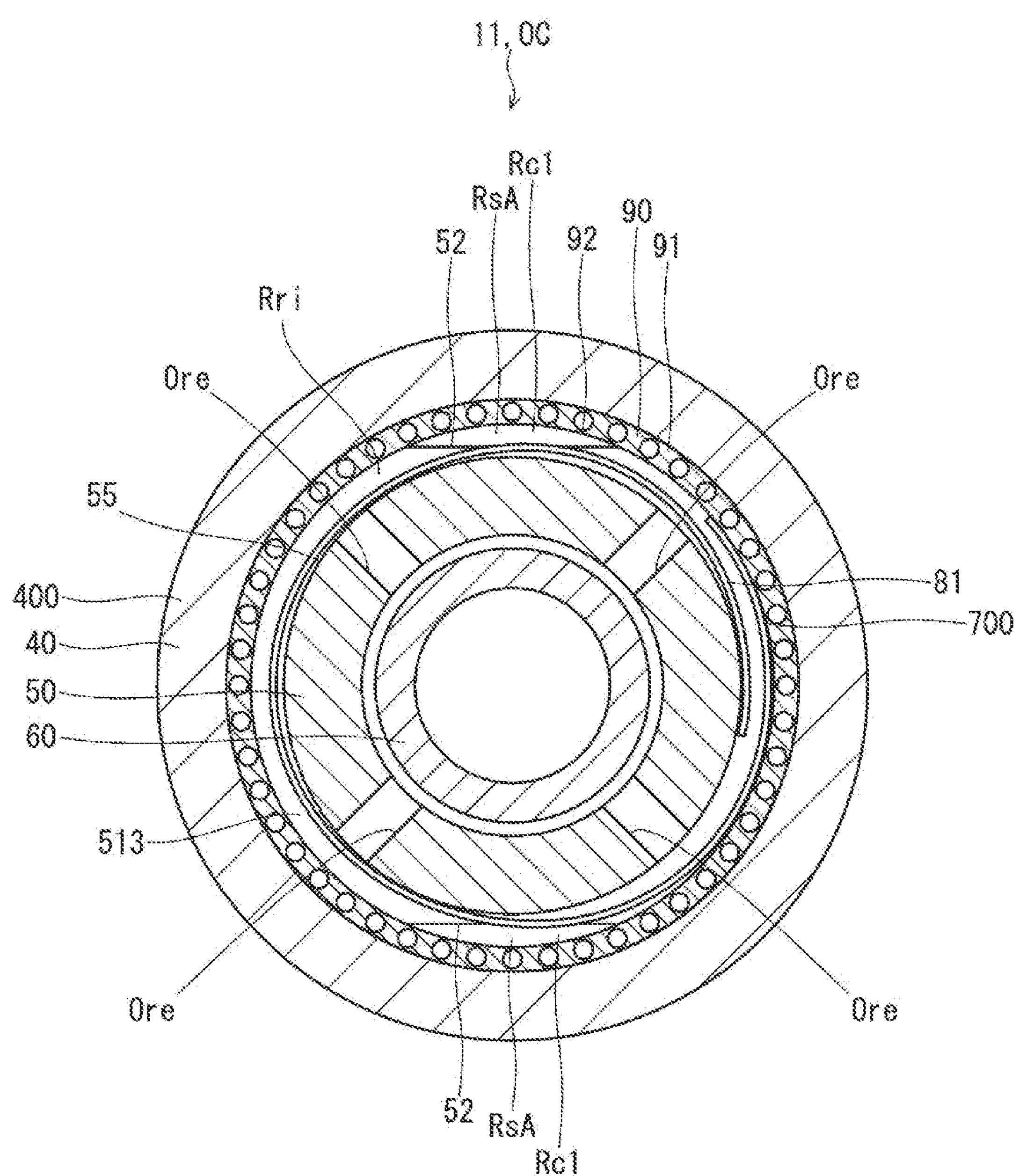
FIG. 12 is a cross-sectional view showing a check valve and a displacement limiter of a fluid control valve according to a third embodiment.

FIG. 12 shows a fluid control valve according to a third embodiment. The third embodiment differs from the first embodiment with respect to the structure of the displacement limiter 90.

In the present embodiment, the limiter main body 91 is made of, for example, metal and is shaped generally in a cylindrical tubular form. The limiter main body 91 is placed on the outer side of the recycle check valve 81 in the annular flow passage Rri. An axial length of the limiter main body 91, which is measured in the axial direction, is substantially the same as an axial length of the recycle check valve 81. Here, an outer peripheral wall of the limiter main body 91 is configured to contact the inner peripheral wall of the outer sleeve 40.

When the diameter of the recycle check valve 81 is increased to place the recycle check valve 81 in the valve opening state, the inner peripheral wall of the limiter main body 91 can contact the outer peripheral wall of the recycle check valve 81 to limit the displacement of the recycle check valve 81 in the diameter increasing direction.

In the present embodiment, each of a plurality of limiter flow passages 92 is a hole that is formed at the limiter main body 91 and connects between one end surface of the limiter main body 91 located on the one side in the axial direction and the other end surface of the limiter main body 91 located on the other side in the axial direction (see FIG. 12). The limiter flow passages 92 are arranged at equal intervals in the circumferential direction along the limiter main body 91. Each of the limiter flow passages 92 is configured to communicate between one side and the other side of the limiter main body 91 in the axial direction of the sleeve 400, so that the hydraulic oil can flow through the limiter flow passage 92. Here, at least a portion of the limiter main body 91 is located at each of connections Rc1, at each of which the annular flow passage Rri and a corresponding one of the axial supply oil passages RsA are connected with each other. Therefore, the hydraulic oil, which flows in the axial supply oil passage RsA, can flow along the limiter flow passages 92, and thereby the interference of the flow of the hydraulic oil by the displacement limiter 90 placed in the annular flow passage Rri is limited.

As described above, in the present embodiment, each of the limiter flow passages 92 is the hole that is formed at the limiter main body 91 and connects between the one end surface of the limiter main body 91 located on the one side in the axial direction and the other end surface of the limiter main body 91 located on the other side in the axial direction. Therefore, the displacement limiter 90, which includes the limiter flow passages 92, can be relatively easily formed.

Fourth Embodiment

Figure 13:
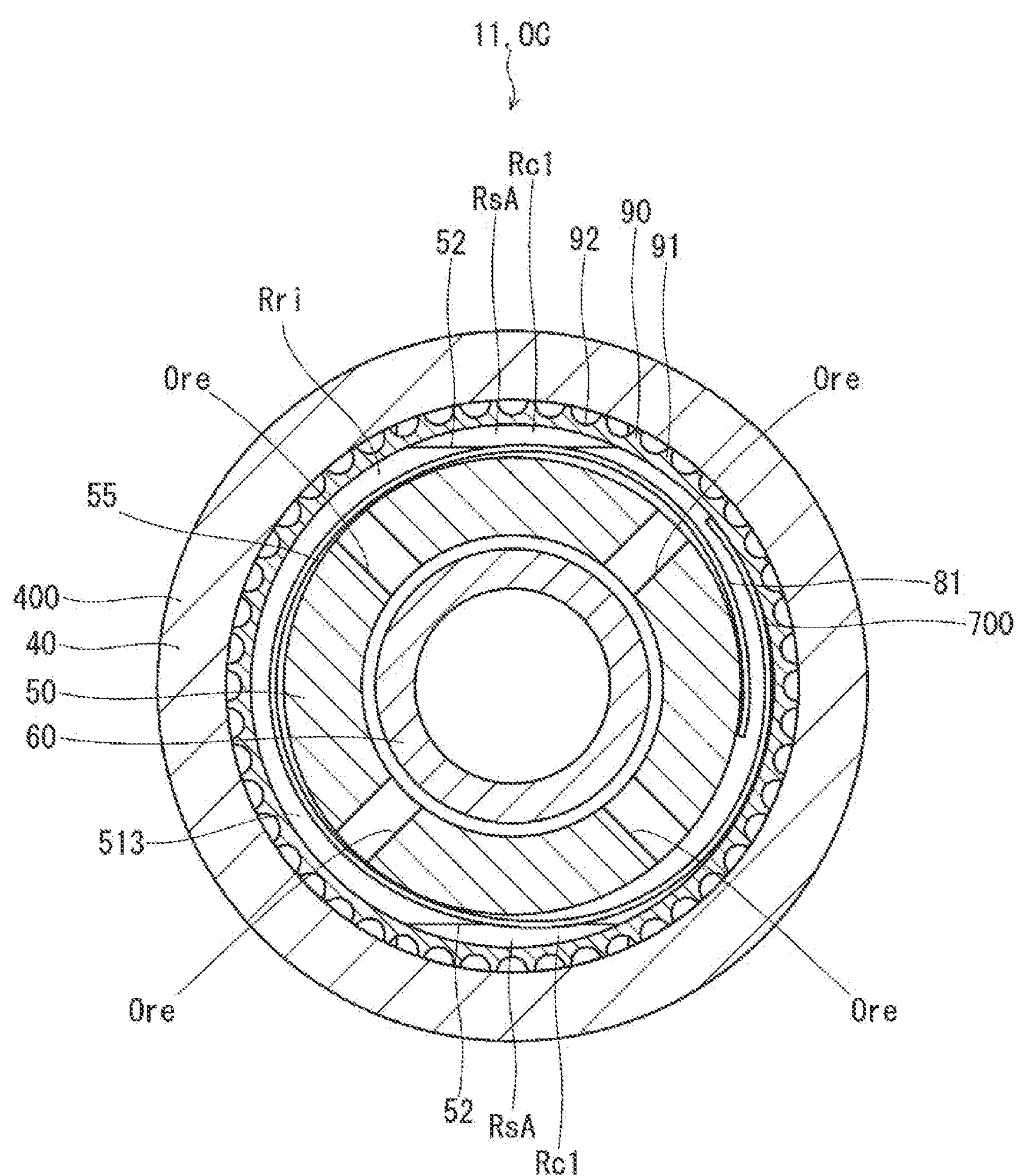
FIG. 13 is a cross-sectional view showing a check valve and a displacement limiter of a fluid control valve according to a fourth embodiment.

FIG. 13 shows a fluid control valve according to a fourth embodiment. The fourth embodiment differs from the third embodiment with respect to the structure of the displacement limiter 90.

In the present embodiment, each of a plurality of limiter flow passages 92 is a groove that is formed at the limiter main body 91 and connects between one end surface of the limiter main body 91 located on the one side in the axial direction and the other end surface of the limiter main body 91 located on the other side in the axial direction (see FIG. 13). Each of the limiter flow passages 92 is formed such that the limiter flow passage 92 is radially inwardly recessed from an outer peripheral wall of the limiter main body 91. The limiter flow passages 92 are arranged at equal intervals in the circumferential direction along the limiter main body 91. Each of the limiter flow passages 92 is configured to communicate between one side and the other side of the limiter main body 91 in the axial direction of the sleeve 400, so that the hydraulic oil can flow through the limiter flow passage 92. Even in the present embodiment, the hydraulic oil, which flows in the axial supply oil passage RsA, can flow along the limiter flow passages 92, and thereby the interference of the flow of the hydraulic oil by the displacement limiter 90 placed in the annular flow passage Rri is limited.

As described above, in the present embodiment, each of the limiter flow passages 92 is the groove that is formed at the limiter main body 91 and connects between the one end surface of the limiter main body 91 located on the one side in the axial direction and the other end surface of the limiter main body 91 located on the other side in the axial direction.

Therefore, the displacement limiter 90, which includes the limiter flow passages 92, can be relatively easily formed.

Fifth Embodiment

Figure 14:
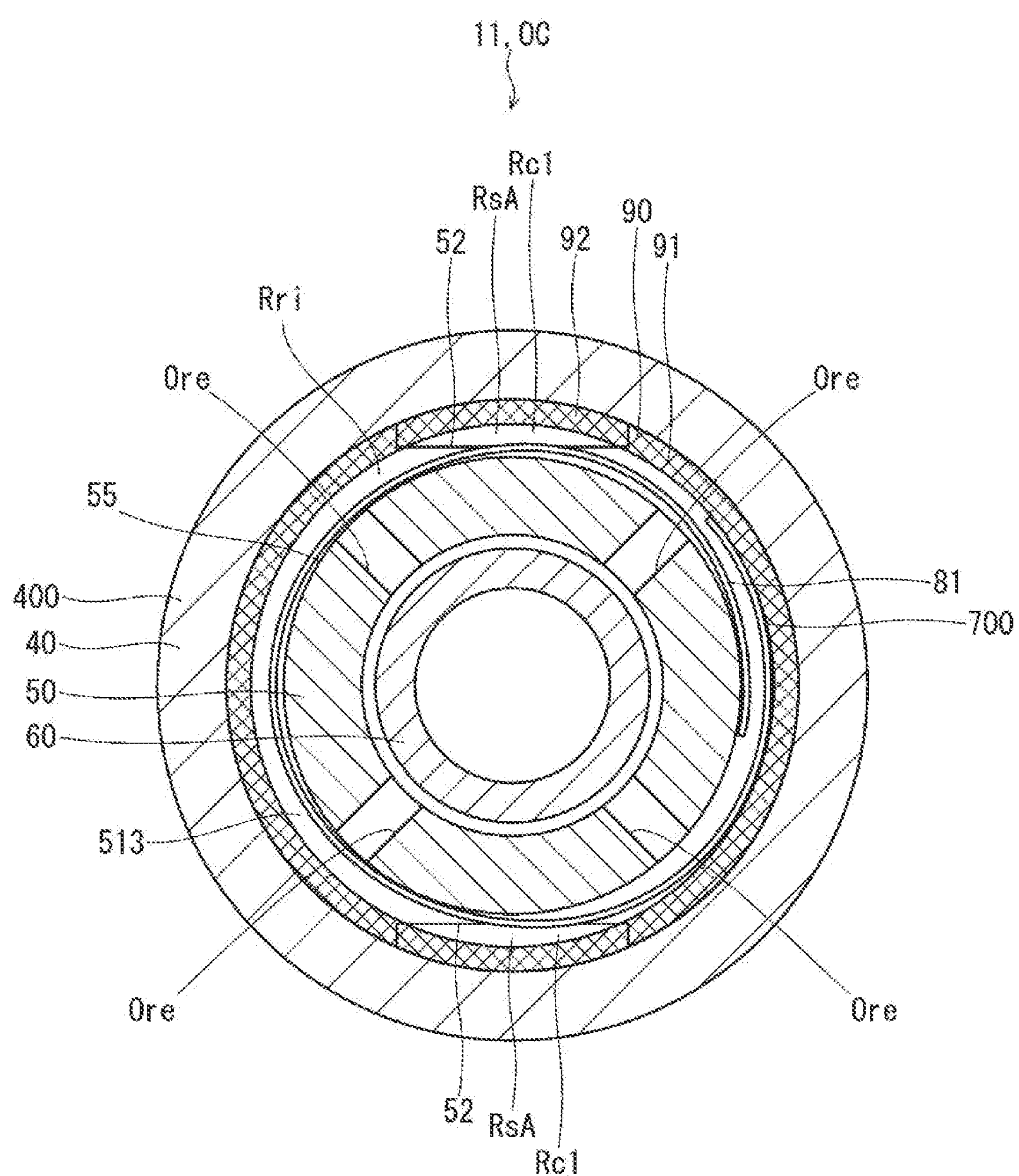
FIG. 14 is a cross-sectional view showing a check valve and a displacement limiter of a fluid control valve according to a fifth embodiment.

FIG. 14 shows a fluid control valve according to a fifth embodiment. The fifth embodiment differs from the third embodiment with respect to the structure of the displacement limiter 90.

In the present embodiment, the limiter main body 91 is a porous body and is shaped generally in a cylindrical tubular form and is formed by sintering, for example, metal. In the present embodiment, the limiter main body 91 is formed as the porous body, so that a large number of limiter flow passages 92 are formed in the limiter main body 91. Each of the limiter flow passages 92 is configured to communicate between one side and the other side of the limiter main body 91 in the axial direction of the sleeve 400, so that the hydraulic oil can flow through the limiter flow passage 92. Even in the present embodiment, the hydraulic oil, which flows in the axial supply oil passage RsA, can flow along the limiter flow passages 92, and thereby the interference of the flow of the hydraulic oil by the displacement limiter 90 placed in the annular flow passage Rri is limited.

As described above, in the present embodiment, the limiter flow passages 92 are formed by forming the limiter main body 91 as the porous body. Therefore, the displacement limiter 90, which includes the limiter flow passages 92, can be relatively easily formed.

Sixth Embodiment

Figure 15:
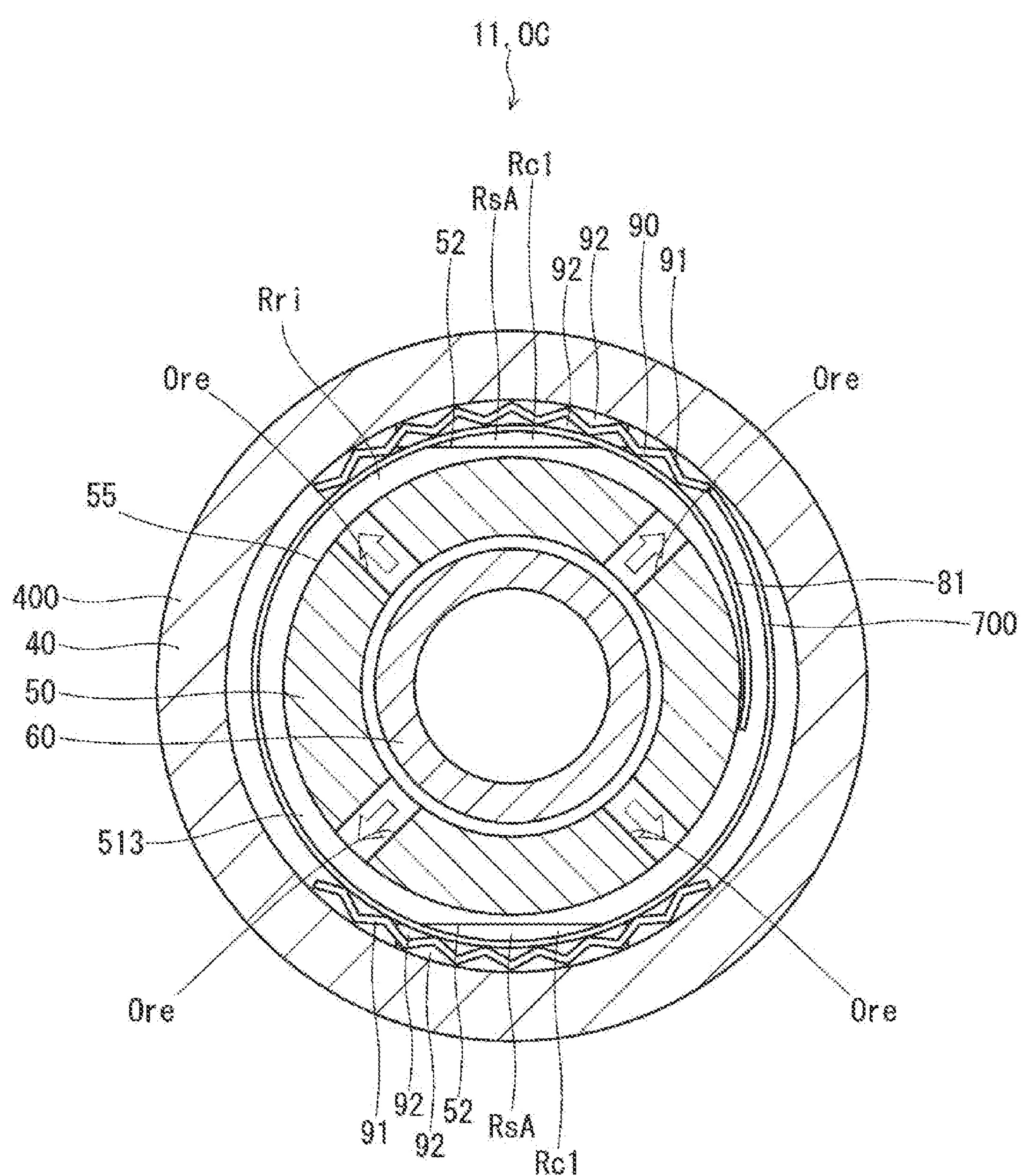
FIG. 15 is a cross-sectional view showing a check valve and a displacement limiter of a fluid control valve according to a sixth embodiment.

FIG. 15 shows a fluid control valve according to a sixth embodiment. The sixth embodiment differs from the first embodiment with respect to the structure of the displacement limiter 90.

In the present embodiment, two limiter main bodies 91 are separated from each other in the circumferential direction of the annular flow passage Rri and are respectively shaped generally in an arcuate form. The two limiter main bodies 91, which are separated from each other, are respectively placed at two locations that respectively correspond to the two axial supply oil passages RsA. Specifically, the two limiter main bodies 91, which are separated from each other, are installed in the annular flow passage Rri such that the limiter main bodies 91 are diametrically opposed to each other about the axis of the sleeve 400. An outer periphery of each limiter main body 91 is fixed to the inner peripheral wall of the outer sleeve 40.

When the diameter of the recycle check valve 81 is increased to place the recycle check valve 81 in the valve opening state, the inner periphery of each of the two limiter main bodies 91 can contact the outer peripheral wall of the recycle check valve 81 to limit the displacement of the recycle check valve 81 in the diameter increasing direction (see FIG. 15).

Here, at least a portion of each limiter main body 91 is located at a corresponding one of the connections Rc1, at each of which the annular flow passage Rri and a corresponding one of the axial supply oil passages RsA are connected with each other. Therefore, the hydraulic oil, which flows in the axial supply oil passage RsA, can flow along the limiter flow passages 92 of each of the limiter main bodies 91, and thereby the interference of the flow of the hydraulic oil by the displacement limiter 90 placed in the annular flow passage Rri is limited.

As described above, in the present embodiment, the plurality of limiter main bodies 91 are separated from each other in the circumferential direction of the annular flow passage Rri, and at least the portion of each of the limiter main bodies 91 is located at the corresponding connection Rc1 between the annular flow passage Rri and the corresponding one of the axial flow passages RsA. Therefore, while reducing the costs of the members of the displacement limiter 90, the displacement limiter 90 can limit a decrease in the flow rate of the hydraulic oil supplied to the retard chambers 201 and the advance chambers 202 and can limit damage of the recycle check valve 81.

Seventh Embodiment

Figure 16:
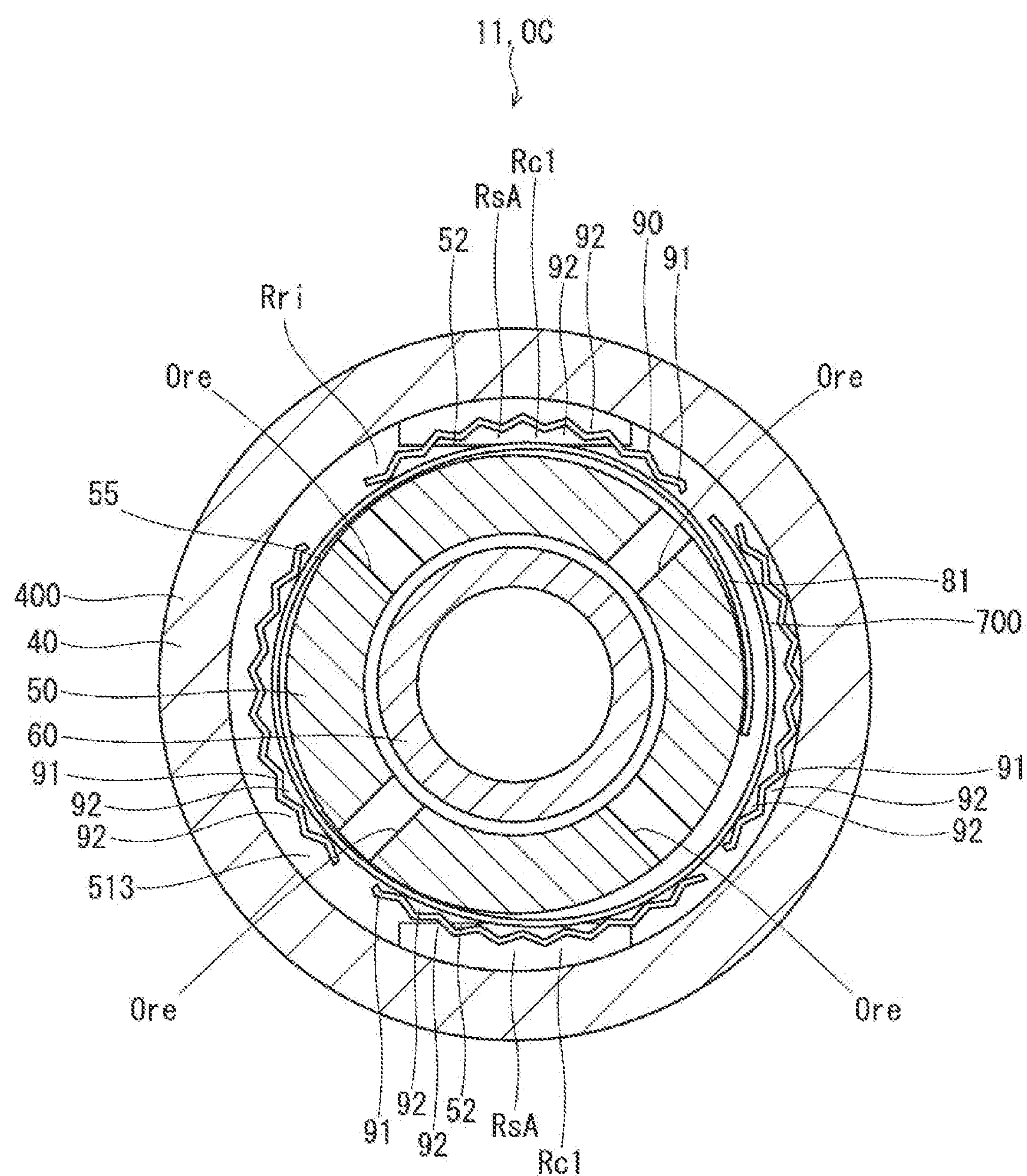
FIG. 16 is a cross-sectional view showing a check valve and a displacement limiter of a fluid control valve according to a seventh embodiment.

FIG. 16 shows a fluid control valve according to a seventh embodiment. The seventh embodiment differs from the first embodiment with respect to the structure of the displacement limiter 90.

In the present embodiment, four limiter main bodies 91 are separated from each other in the circumferential direction of the annular flow passage Rri and are respectively shaped generally in an arcuate form. The four limiter main bodies 91, which are separated from each other, are arranged at equal intervals in the circumferential direction of the annular flow passage Rri. Two of the four limiter main bodies 91, which are diametrically opposed to each other, are respectively placed at two locations that respectively correspond to the two axial supply oil passages RsA. An inner periphery of each limiter main body 91 is fixed to the outer peripheral wall of the recycle check valve 81. Therefore, each of the limiter main bodies 91 can move integrally with the recycle check valve 81 in response to the valve opening and closing operation of the recycle check valve 81.

When the diameter of the recycle check valve 81 is increased to place the recycle check valve 81 in the valve opening state, the outer periphery of each of the limiter main bodies 91 provided to the recycle check valve 81 can contact the inner peripheral wall of the outer sleeve 40 to limit the displacement of the recycle check valve 81 in the diameter increasing direction.

Here, at least a portion of the corresponding limiter main body 91 is located at the corresponding one of the connections Rc1, at which the annular flow passage Rri and the corresponding one of the axial supply oil passages RsA are connected with each other. Therefore, the hydraulic oil, which flows in the axial supply oil passage RsA, can flow along the limiter flow passages 92, and thereby the interference of the flow of the hydraulic oil by the displacement limiter 90 placed in the annular flow passage Rri is limited.

As discussed above, in the present embodiment, the limiter main bodies 91 are fixed to the outer peripheral wall of the recycle check valve 81 and are configured to move integrally with the recycle check valve 81 in response to the valve opening and closing operation of the recycle check valve 81. Therefore, it is possible to reduce the collision between the recycle check valve 81 and the limiter main body 91 when the displacement limiter 90 limits the displacement of the recycle check valve 81 in the diameter increasing direction. As a result, wear and damage of the recycle check valve 81 and the limiter main bodies 91 can be limited.

Eighth Embodiment

Figure 17:
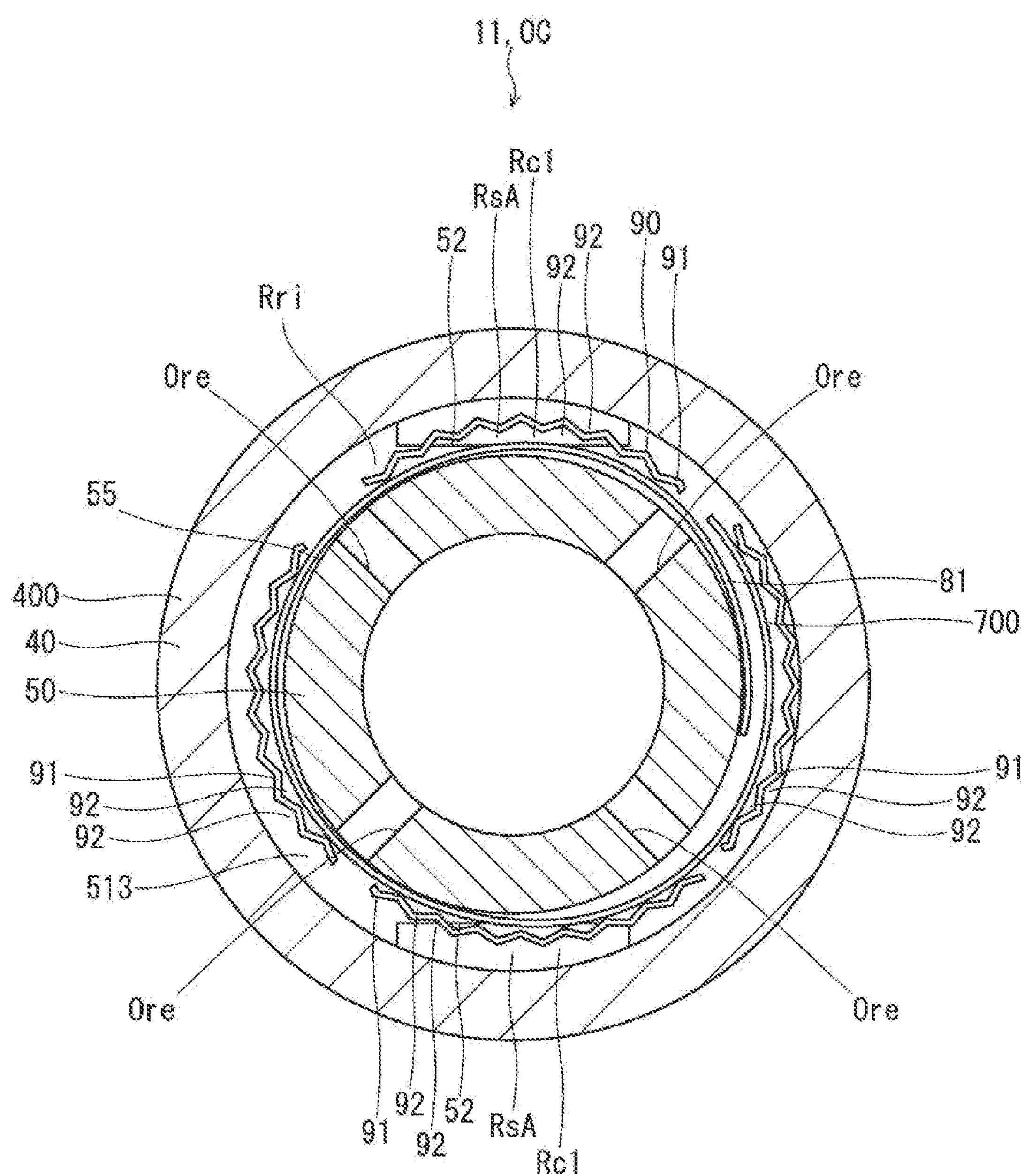
FIG. 17 is a cross-sectional view showing a check valve and a displacement limiter of a fluid control valve according to an eighth embodiment.

FIG. 17 shows a fluid control valve according to an eighth embodiment. The eighth embodiment differs from the seventh embodiment with respect to the structure of the sleeve 400.

In the present embodiment, the hydraulic oil control valve 11 does not include the spool 60. The inner sleeve 50 is placed at the inside of the outer sleeve 40 such that the inner sleeve 50 is movable in the axial direction relative to the outer sleeve 40. The axial position of the inner sleeve 50 relative to the outer sleeve 40 changes in response to the operation of the linear solenoid 9. The inner sleeve 50 can control the flow of the hydraulic oil between the hydraulic oil supply source OS and the retard and advance chambers 201, 202 depending on the axial position of the inner sleeve 50 relative to the outer sleeve 40.

In the present embodiment, the displacement limiter 90 is moved in the axial direction along with the recycle check valve 81 and the inner sleeve 50 relative to the outer sleeve 40 at the time when the inner sleeve 50 controls the flow of the hydraulic oil. In the present embodiment, the limiter main bodies 91 of the displacement limiter 90 are installed such that the inner periphery of each of the limiter main bodies 91 is fixed to the outer peripheral wall of the recycle check valve 81. Therefore, the contact between the outer periphery of each limiter main body 91 and the inner peripheral wall of the outer sleeve 40 is limited. When the displacement limiter 90 is moved in the axial direction relative to the outer sleeve 40, sliding between the outer periphery of the limiter main body 91 and the inner peripheral wall of the outer sleeve 40 is limited. Therefore, the position of the displacement limiter 90 and the position of the recycle check valve 81 relative to the outer sleeve 40 are stabilized at the time when the inner sleeve 50 controls the flow of the hydraulic oil.

As described above, in the present embodiment, the inner sleeve 50 is configured to move in the axial direction relative to the outer sleeve 40 at the inside of the outer sleeve 40, and the inner sleeve 50 is configured to control the flow of the fluid between the hydraulic oil supply source OS and the retard chambers 201 and the advance chambers 202 according to the position of the inner sleeve 50 in the axial direction relative to the outer sleeve 40. As described above, the present embodiment can be applied to the fluid control valve, in which the spool is not provided, and the flow of the fluid is controlled with the inner tubular portion that is configured to move relative to the outer tubular portion.

Other Embodiments

In the fourth embodiment, there is described the example where each of the limiter flow passages 92 is the groove that is radially inwardly recessed at the outer peripheral wall of the limiter main body 91. Alternatively, in another embodiment, each of the limiter flow passages 92 may be a groove that is radially outwardly recessed at the inner peripheral wall of the limiter main body 91.

Furthermore, in the sixth, seventh and eighth embodiments, there is described the example where the two or four limiter main bodies 91, which are separated from each other in the circumferential direction of the annular flow passage Rri, are, provided. However, the number of the limiter main bodies 91, which are separated from each other in the circumferential direction of the annular flow passage Rri, should not be limited to two or four and may be changed to any number.

Furthermore, in another embodiment, as long as the displacement limiter has the limiter flow passage(s), which communicates between the one side and the other side of the limiter main body in the axial direction of the outer tubular portion and the inner tubular portion to enable the fluid to flow between the one side and the other side of the limiter main body through the limiter flow passage, the limiter main body may be made of any material and may be shaped in any form.

Furthermore, in the above embodiments, there is described the example where the hydraulic oil control valve 11 is installed at the center part of the phase converter PC. Alternatively, in another embodiment, the hydraulic oil control valve 11 may be placed at the outside of the phase converter PC. In this case, the size of the phase converter PC can be reduced.

The application of the fluid control valve of the present disclosure should not be limited to the valve timing adjusting device, and the fluid control valve of the present disclosure may be used to control flow of fluid supplied to another type of supply destination, such as a device other than the valve timing adjusting device.

As discussed above, the present disclosure should not be limited to the above embodiments and can be implemented in various forms without departing from the scope thereof.

The present disclosure has been described with reference to the embodiments. However, the present disclosure should not be limited to the embodiments and the structures described above. The present disclosure covers various modifications and variations on the scope of equivalents. Also, various combinations and forms as well as other combinations, each of which includes only one element or more or less of the various combinations, are also within the scope and spirit of the present disclosure.

What is claimed is:

1. A fluid control valve configured to control flow of fluid supplied from a fluid supply source to a fluid supply destination, comprising:

- an outer tubular portion;
- an inner tubular portion that is located at an inside of the outer tubular portion;
- an axial flow passage that is located between the outer tubular portion and the inner tubular portion and extends in an axial direction of the outer tubular portion and the inner tubular portion such that the axial flow passage conducts the fluid that flows from the fluid supply source to the fluid supply destination;
- an annular flow passage that is located between the outer tubular portion and the inner tubular portion and is shaped in an annular form to extend in a circumferential direction of the outer tubular portion and the inner tubular portion while the annular flow passage is connected to the axial flow passage;
- a valve seat surface that is shaped in a cylindrical form and is formed at the inner tubular portion in the annular flow passage;
- a valve seat flow passage that communicates between the valve seat surface and an inside of the inner tubular portion;
- a check valve that is made of a resilient body wound in a ring form and is radially located between the outer tubular portion and the inner tubular portion in the annular flow passage, wherein the check valve is placed in a valve opening state to enable flow of the fluid from the valve seat flow passage to the annular flow passage when a diameter of the check valve is increased in a diameter increasing direction to lift the check valve away from the valve seat surface, and the check valve is placed in a valve closing state to limit flow of the fluid from the annular flow passage to the valve seat flow passage when the diameter of the check valve is decreased to seat the check valve against the valve seat surface; and a displacement limiter that includes:

a limiter main body that is formed separately from the outer tubular portion and the inner tubular portion, wherein the limiter main body is located on an outer side of the check valve in the annular flow passage and is configured to limit displacement of the check valve in the diameter increasing direction of the check valve; and a limiter flow passage that communicates between one side and another side of the limiter main body in the axial direction of the outer tubular portion and the inner tubular portion to enable the fluid to flow between the one side and the another side of the limiter main body through the limiter flow passage.

2. The fluid control valve according to claim 1, wherein the limiter main body is formed by a corrugated plate material that is wound in a ring form.

3. The fluid control valve according to claim 1, wherein the limiter main body is formed by a spirally wound wire material that is further wound in a ring form.

4. The fluid control valve according to claim 1, wherein:

the limiter main body is shaped in a tubular form; and the limiter flow passage is a hole or a groove that is formed at the limiter main body and connects between one end surface of the limiter main body located on the one side in the axial direction and another end surface of the limiter main body located on the another side in the axial direction.

5. The fluid control valve according to claim 1, wherein the limiter main body is one of a plurality of limiter main bodies, which are separated from each other in the circumferential direction in the annular flow passage, while the axial flow passage is one of a plurality of axial flow passages, and at least a portion of each of the plurality of limiter main bodies is located at a connection between the annular flow passage and a corresponding one of the plurality of axial flow passages.

6. The fluid control valve according to claim 1, wherein the limiter main body is fixed to an outer peripheral wall of the check valve and is configured to move integrally with the check valve in response to a valve opening and closing operation of the check valve.

7. The fluid control valve according to claim 1, wherein the limiter main body is resiliently deformable in a radial direction of the annular flow passage.

8. The fluid control valve according to claim 1, further comprising a spool that is located at the inside of the inner tubular portion and is configured to move in the axial direction relative to the inner tubular portion, wherein the spool is configured to control the flow of the fluid between the fluid supply source and the fluid supply destination according to a position of the spool in the axial direction relative to the inner tubular portion.

9. The fluid control valve according to claim 1, wherein the inner tubular portion is configured to move in the axial direction relative to the outer tubular portion at the inside of the outer tubular portion, and the inner tubular portion is configured to control the flow of the fluid between the fluid supply source and the fluid supply destination according to a position of the inner tubular portion in the axial direction relative to the outer tubular portion.

10. A valve timing adjusting device configured to adjust valve timing of an internal combustion engine, comprising:

a phase converter that is installed to a driven shaft of the internal combustion engine such that the phase converter is rotatable synchronously with a drive shaft of the internal combustion engine, wherein the phase converter includes a hydraulic chamber that serves as the fluid supply destination, and the phase converter is configured to shift a phase between the drive shaft and the driven shaft by the fluid supplied to the hydraulic chamber; and the fluid control valve of claim 1 that is configured to control the fluid supplied from the fluid supply source to the hydraulic chamber.

11. The valve timing adjusting device according to claim 10, wherein the fluid control valve is installed at a center part of the phase converter.

12. The fluid control valve according to claim 1, wherein the limiter flow passage is one a plurality of limiter flow passages that are circumferentially arranged along the limiter main body and communicate between the one side and the another side of the limiter main body in the axial direction in the valve opening state of the check valve where the check valve is radially outwardly urged against the limiter main body.

13. The fluid control valve according to claim 1, wherein the limiter main body does not radially inwardly apply an urging force against the check valve in the valve closing state of the check valve.

14. The fluid control valve according to claim 1, wherein the limiter main body contacts an inner peripheral surface of the outer tubular portion.

* * * * *